United States Patent
Breton et al.

(10) Patent No.: US 7,289,124 B2
(45) Date of Patent: Oct. 30, 2007

(54) FACIAL ANIMATION METHOD

(75) Inventors: Gaspard Breton, Saint Gregoire (FR); Christian Bouville, Vern sur Seiche (FR); Danielle Pele, Thorigne-Fouillard (FR)

(73) Assignee: Franee Telecom, Paris (FR)

( * ) Notice: Subject to any disclaimer, the term of this patent is extended or adjusted under 35 U.S.C. 154(b) by 673 days.

(21) Appl. No.: 10/258,879

(22) PCT Filed: Jul. 11, 2001

(86) PCT No.: PCT/FR01/02236

§ 371 (c)(1),
(2), (4) Date: Mar. 17, 2003

(87) PCT Pub. No.: WO02/07101

PCT Pub. Date: Jan. 24, 2002

(65) Prior Publication Data

US 2003/0160791 A1    Aug. 28, 2003

(30) Foreign Application Priority Data

Jul. 13, 2000    (FR) .................................. 00 09437

(51) Int. Cl.
G06T 17/00    (2006.01)
G06T 17/30    (2006.01)
(52) U.S. Cl. ...................... 345/473; 345/420
(58) Field of Classification Search ................. 345/420
See application file for complete search history.

(56) References Cited

U.S. PATENT DOCUMENTS 5,680,531 A * 10/1997 Litwinowicz et al. ....... 345/473
5,969,721 A * 10/1999 Chen et al. .................. 345/419
6,188,776 B1 * 2/2001 Covell et al. ................ 382/100
6,307,558 B1 * 10/2001 Mao ........................... 345/428
6,381,346 B1 * 4/2002 Eraslan ....................... 382/118
6,504,546 B1 * 1/2003 Cosatto et al. .............. 345/473
6,664,956 B1 * 12/2003 Erdem ........................ 345/419

OTHER PUBLICATIONS

K. Waters; "A Muscle Model for Animating Three-Dimensional Facial Expression"; Computer Graphics, vol. 21, No. 4; Jul. 1, 1987.*

(Continued)

*Primary Examiner*—Mark Zimmerman
*Assistant Examiner*—Andrew Yang
(74) *Attorney, Agent, or Firm*—Lowe Hauptman Ham & Berner LLP

(57) ABSTRACT

A 3D imaged head consisting of a set of meshes is animated by modelled facial muscles. For natural animation of the lips in speech, the lower and upper lips are distinguished in a set of lip mesh based on the nodes of the mesh on a boundary of the lip corner and mouth opening, and lower and upper zones of the head are divided by the boundary. Modelled muscles attached to the upper lip, with intersecting zones of influence in the upper zone, and attached to the lower lip, with intersecting zones of influence in the lower zone, displace nodes of mesh respectively in the upper lip and under the nose and in the lower lip and the chin. Other muscles have zones of influence in the lower and upper zones.

25 Claims, 17 Drawing Sheets

OTHER PUBLICATIONS

K. Waters; "A Muscle Model for Animating Three-Dimensional FacialExpression"; Computer Graphics, vol. 21, No. 4; Jul. 1, 1987.*

Terzopoulos D. et al; "Analysis and Synthesis of Facial Image Sequences Using Physical and Anatomical Models"; IEEE Transactions on Pattern Analysis and Machine Intelligence, US. IEEE Inc. N.Y.; vol. 15, No. 6; Jun. 1, 1993.

K. Waters; "A Muscle Model for Animating Three-Dimensional Facial Expression"; Computer Graphics, cvol. 21, No. 4; Jul. 1, 1987.

Young-Wei L. et al; "A Three-Dimensional Muscle-Based Facial Xpression Sunthesizer for Model-Based Image Coding"; Signal Processing, Image Communication, NL, Elsevier Science Publishers, Amsterdam, vol. 8, No. 4; May 1, 1996.

Gang Xu et al; Three-Dimensional Face Modeling for Virtual Space Teleconferencing Systems ; Transaction of the Institute of Electronics, Information and Communication Engineers of Japan, Japan Institute of Electronics & Communication Engineers of Japan, Tokyo, vol. E73, No. 10; Oct. 1, 1990.

Waters K. et al; "A Coordinated Muscle Model for Speech Animation"; Proc. Graphics Interface '95; May 17, 1995.

Yuencheng Lee et al; "Realistic Modeling Far Facial Animation"; Computer Graphics Proceedings (SIGGRAPH), US, New York, IEEE; Aug. 6, 1995.

* cited by examiner

FIG. 7

| Reference | Name | Function : "displacement toward" | Zone |
|---|---|---|---|
| M1G | Left internal nasal-labial muscle | Upper part of the left alae of the nose | ZI, ZS |
| M1D | Right internal nasal-labial muscle | Upper part of the right alae of the nose | ZI, ZS |
| M2 | Labial levator muscle | Upper part of the middle of the upper lip | ZS |
| M3G | Left nasal-labial muscle | Upper and left parts of the upper lip | ZS |
| M3D | Right nasal-labial muscle | Upper and right parts of the upper lip | ZS |
| M4G | Left large zygomatic | Upper and left parts of the upper lip | ZI, ZS |
| M4D | Right large zygomatic | Upper and right parts of the upper lip | ZI, ZS |
| M5G | Left risorius muscle | Left of the lips | ZI, ZS |
| M5D | Right risorius muscle | Right of the lips | ZI, ZS |
| M6G | Left angular depressor muscle | Lower and left parts of the lower lip | ZI, ZS |
| M6D | Right angular depressor muscle | Lower and right parts of the lower lip | ZI, ZS |
| M7G | Left triangular muscle | Lower and left parts of the lower lip | ZI |
| M7D | Right triangular muscle | Lower and right parts of the lower lip | ZI |
| M8 | Chin muscle | Lower part of the middle of the lower lip | ZI |
| M9G | Left orbicularis muscle | Middle of the mouth of the left part of the lips | ZI, ZS |
| M9D | Right orbicularis muscle | Middle of the mouth of the right part of the lips | ZI, ZS |
| M9F | Frontal orbicularis muscle | Exterior of the mouth of the lips | ZI, ZS |

FIG. 12

| Reference | Name | Function : "displacement toward" | Zone |
|---|---|---|---|
| M10G | Left external frontal muscle | Upper part of the exterior of the left eyebrow | ZI, ZS |
| M10D | Right external frontal muscle | Upper part of the exterior of the right eyebrow | ZI, ZS |
| M11G | Left large frontal | Upper part of the middle of the left eyebrow | ZI, ZS |
| M11D | Right large frontal | Upper part of the middle of the right eyebrow | ZI, ZS |
| M12G | Left internal frontal | Upper part of the interior of the left eyebrow | ZI, ZS |
| M12D | Right internal frontal | Upper part of the interior of the right eyebrow | ZI, ZS |
| M13G | Left lateral corrugator | Lower and middle parts of the left eyebrow | ZI, ZS |
| M13D | Right lateral corrugator | Lower and middle parts of the right eyebrow | ZI, ZS |
| M14G | Left lower orbicularis muscle | External corner of the left eye | ZI, ZS |
| M14D | Right lower orbicularis muscle | External corner of the right eye | ZI, ZS |
| M15G | Left upper orbicularis muscle | Middle of the left upper eyelid | ZI, ZS |
| M15D | Right upper orbicularis muscle | Middle of the right upper eyelid | ZI, ZS |

FIG. 14

| Reference | Group | Muscles | Number |
|---|---|---|---|
| G1 | Upper lip LS | M2, M3G, M3D, M4G, M4D | 5 |
| G2 | Lower lip LI | M6G, M6D, M7G, M7D, M8 | 5 |
| G3 | Left frontal | M10G, M11G, M12G, M15G | 4 |
| G4 | Right frontal | M10D, M11D, M12D, M15D | 4 |
| G5 | others | M1G, M1D, M5G, M5D, M9G, M9D, M9F, M13G, M13D, M14G, M14D | 11 |

FACIAL ANIMATION METHOD

BACKGROUND OF THE INVENTION

1. Field of the Invention

The present invention relates to a method of animating faces in three dimensions used in a data processing means including an engine for animating the head of a speaker previously stored and analyzed. For example, the data processing means relates to teleconferencing, teleworking or collaborative work, or intelligent agents for reading out pages of electronic mail, or virtual assistants with applications to e-commerce.

2. Description of the Prior Art

In the prior art, most animation engines are not muscular and the face is often animated by morphing between key expressions of the head produced manually by artists. Muscular animation engines are generally more comprehensive but do not take into account the elasticity of the skin, which rules out real time animation of the head.

A muscular animation engine is of interest because of the ease with which it can describe an animation as a set of muscular contractions, the head being structured in terms of predetermined sets of meshes, for example the lips, the eyes, the eyelids, etc. These sets of contractions can often be generalized from face to face. For example, a smile is always obtained by contraction of the zygomaticus muscles acting on the corners of the lips.

For example the following papers by Keith WATER: "A Muscle Model for Animating Three-Dimensional Facial Expression", Computer Graphics, vol. 21, no. Jul. 4, 1987, pages 17-24, and "Analysis and Synthesis of Facial Image Sequences Using Physical and Anatomical Models", IEEE Transactions on Pattern Analysis and Machine Intelligence, No. 6, pages 569 to 579, Jun. 15, 1993, suggest animating the face by means of muscle mobilization in the form of a vector within an angular influence sector within which a mesh node is moved as a function of an angular attenuation factor and a radial attenuation factor.

However, in the above type of animation engine, the lips are dissociated and the mouth is opened by rotation of the lower jaw fastened to the lower lip. This rotation destroys the corners of the lips, which does not reflect accurately the independent movement of the lips when speaking.

OBJECT OF THE INVENTION

The present invention aims to improve animation of the lips, without making it overcomplex, and so that it reproduces more faithfully the corresponding real movement of the lips and is executed in real time.

SUMMARY OF THE INVENTION

Accordingly, a method of animating a head imaged in three dimensions and acquired in a data processing means in the form of sets of meshes including a set of lips, by means of modelled facial muscles, is characterized in that it includes the steps of:

- distinguishing lower and upper lips in the set of lips as a function of mesh nodes at the level of a lip corner and a mouth opening boundary,
- determining upper and lower zones of the head substantially shared by at least the boundary, and
- constituting a first group of modelled muscles extending toward the upper lip and having zones of influence intersecting at least two by two situated in the upper zone for displacing mesh nodes in the upper lip and under the nose of the head, a second group of modelled muscles extending toward the lower lip and having zones of influence intersecting at least two by two situated in the lower zone for displacing mesh nodes in the lower lip and in the chin of the head, and a last group of modelled muscles having zones of influence for displacing each of the mesh nodes in the upper and lower zones in order to stretch and contract the lips.

Thanks to the distribution of muscles modelled in the first, second and third groups independent with respect to each other and to the influence of at least two muscles on certain mesh nodes, the speaking mouth opens in a more natural manner.

As will become clear later, the invention also provides parametric animation through determining parameters for animating at least one of the following organs: an eye, an eyelid, a lower jaw, a neck.

The invention also relates to client-server systems relating to animation of the face. According to a first embodiment, the client includes a data processing means having acquired a head imaged in three dimensions in the form of sets of meshes and parameters by the method according to the invention, for animating the head as a function of animation commands. The server is a processing server for converting responses read in a database addressed by requests corresponding to messages transmitted by the client into messages and animation commands transmitted to the client.

According to a second embodiment of the client-server system, the server is a database server and the client includes a data processing means and a conversational means. The processing means has acquired a head imaged in three dimensions in the form of sets of meshes and parameters by the method according to the invention, for animating the head as a function of animation commands. The conversational means converts responses read in the database server addressed by requests corresponding to messages provided in the client into messages applied in the client and animation commands transmitted to the data processing means.

The sets of meshes and the parameters are preferably selected and acquired from a predetermined server.

BRIEF DESCRIPTION OF THE DRAWINGS

Other features and advantages of the present invention will become more clearly apparent on reading the following description of a plurality of preferred embodiments of the invention, with reference to the corresponding accompanying drawings, in which:

FIG. 7 is a table indicating the functions of the facial muscles shown in FIG. 6 and controlling the movement of the lips, as well as zones of influence of these muscles relative to the upper and lower zones;

FIG. 12 is a table indicating the functions of the frontal muscles shown in FIG. 6 and zones of influence of these muscles relative to the upper and lower zones;

FIG. 14 is a table of the distribution of facial muscles into groups in view of their additive or independent contribution to mesh node displacements;

DESCRIPTION OF THE PREFERRED EMBODIMENTS

Figure 1:
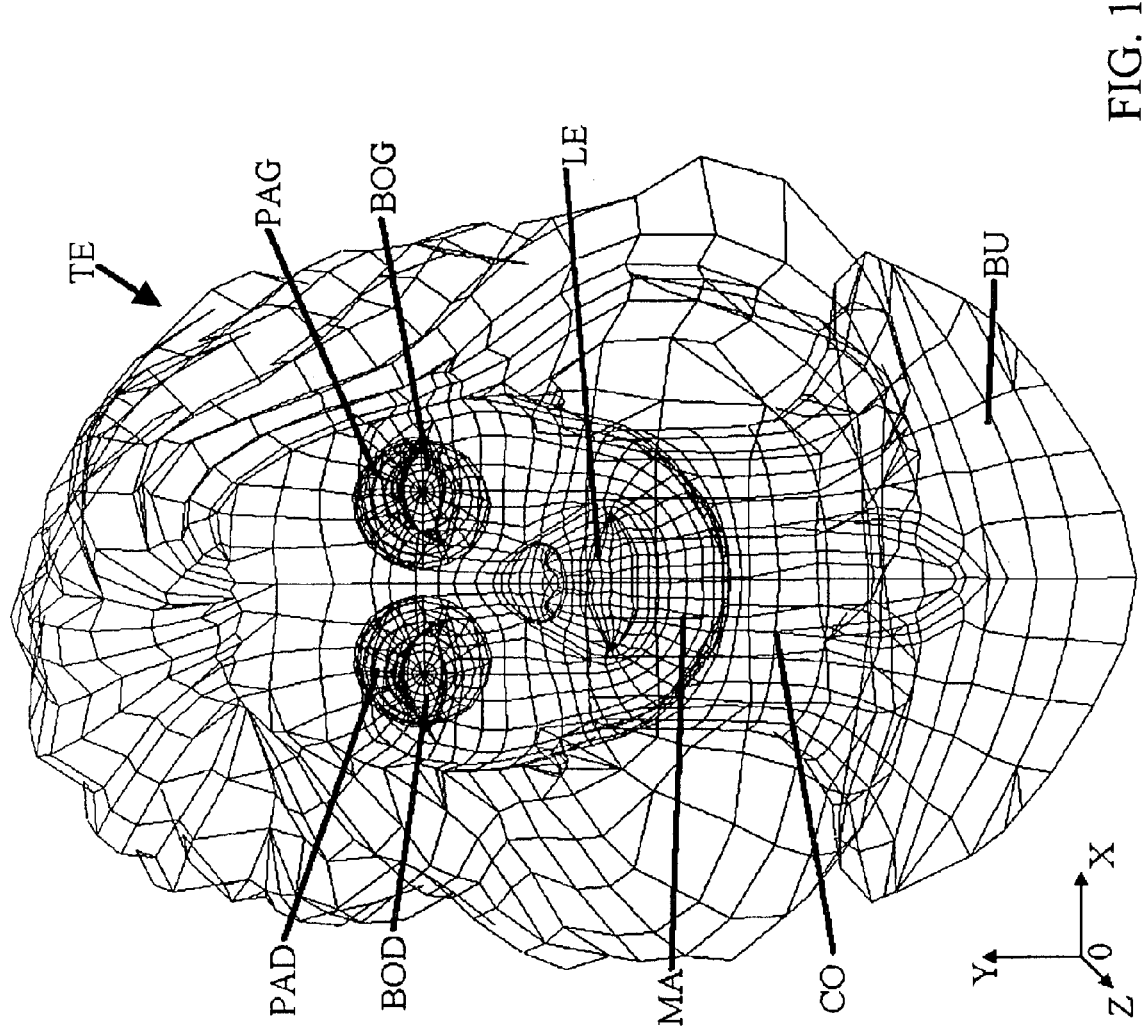
FIG. 1 is a meshed front view of a head.
Figure 2:
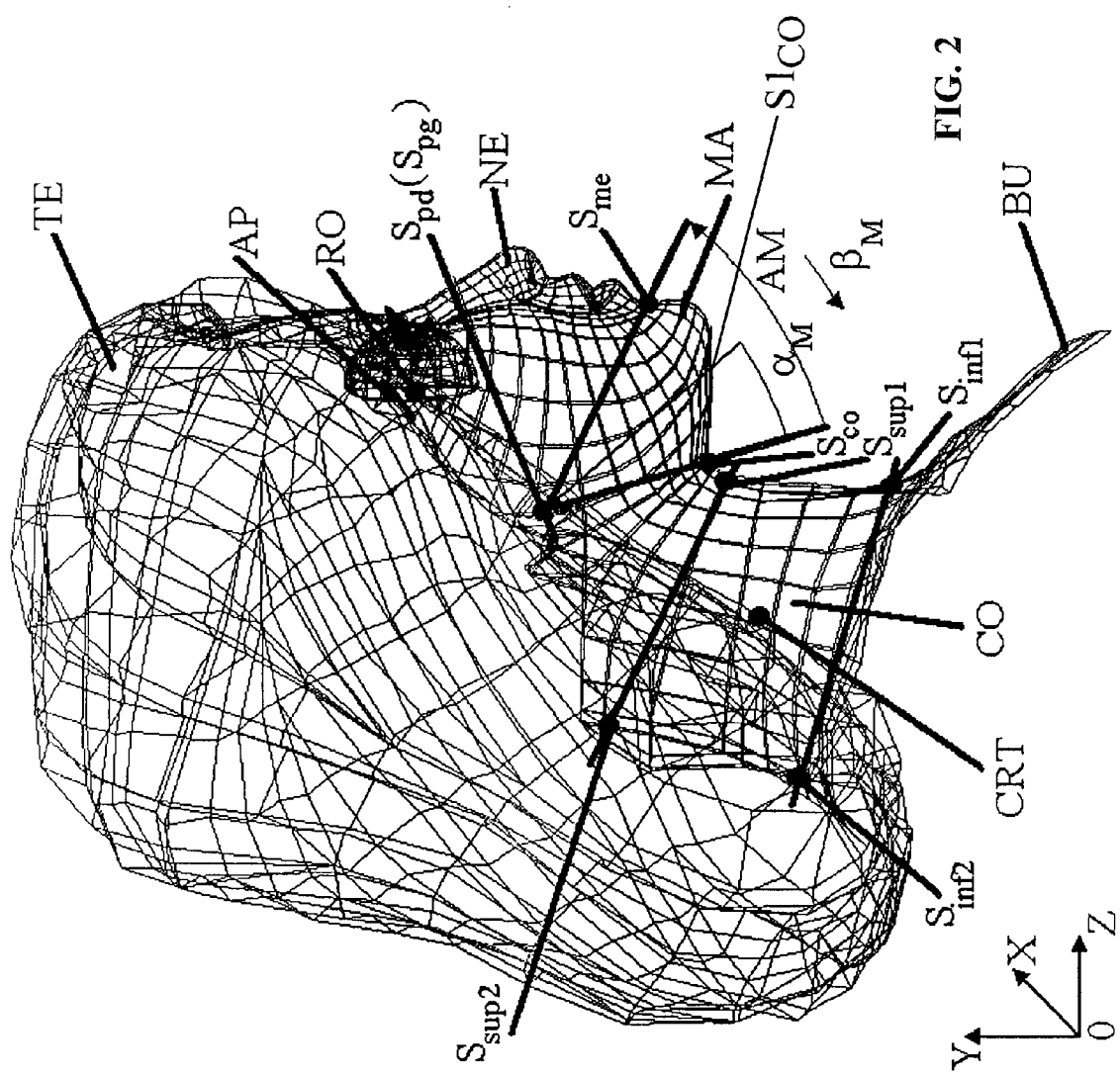
FIG. 2 is a meshed side view of the head.

The facial animation method according to the invention is used in an animation engine implemented in a data processing means which is installed, for example, in a personal computer, a multimedia Internet server, or a teleconferencing or teleworking terminal which has received the three-dimensional image of the head TE of a speaker facing the terminal in order to transmit it to the terminal of a remote speaker during the teleconference. In another variant, a virtual assistant installed in a public terminal providing access to databases, for example shopping and tourist information databases, has stored the three-dimensional image of the head TE of an operator-receptionist in order to display it while information is being listened to. As shown in FIGS. 1 and 2, respectively in front view in a plane XOY and in right-hand side view in a plane YOZ, the head TE of the speaker or the operator has been acquired by the data processing means in the form of a three-dimensional meshed image produced by a scanner or deduced from one or more photographs of the head analyzed by software that is not part of the invention.

In an initial step E0, the head TE is defined superficially by a plurality of sets of polygonal (essentially triangular and quadrilateral) meshes in which respective animations can be applied. However, the bust BU covered by garments are generally not animated. The sets of triangular meshes include particularly the facial epidermis, the lips LE, the right and left upper eyelids PD and PG, and the whites BOG and BOD of the left eye and the right eye, for example.

In the remainder of the description, $S_i$ and $S_j$ designate any two mesh nodes.

Figure 3:
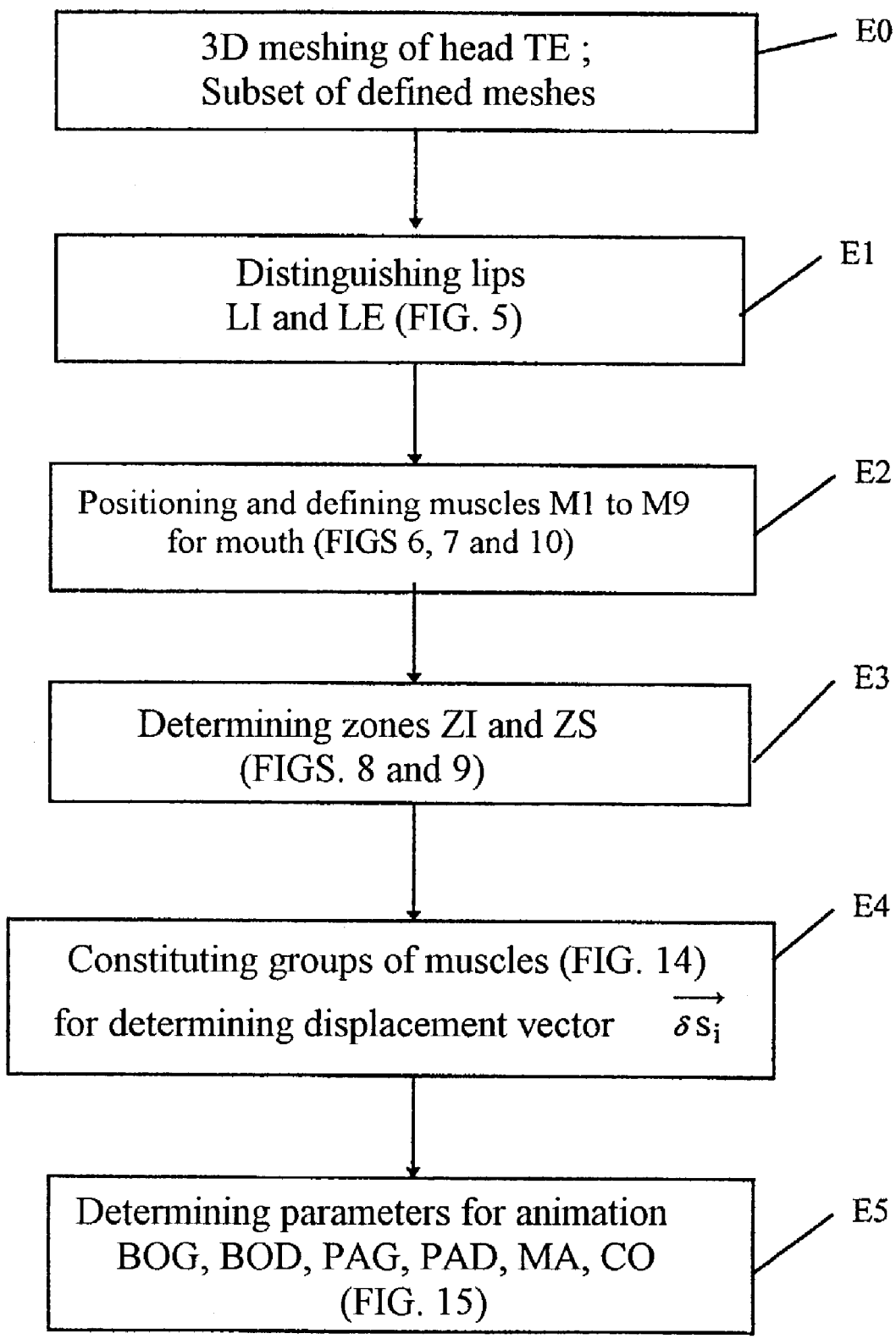
FIG. 3 is an algorithm of the facial animation method in accordance with a preferred embodiment of the invention.

As shown in FIG. 3, the facial animation method implemented in the form of software in the data processing means includes the initial step E0 relating to the superficial meshing of the face in three dimensions, as described previously, followed by steps E1 to E5 specific to the invention. The method allows real time automatic animation of the head, and in particular of the face, of the speaker or operator, as a function of an analysis of their voice or a text, so as to translate phonemes into animation of the face of the speaker or operator. Movement of the lips is essential for this animation.

Figure 4:
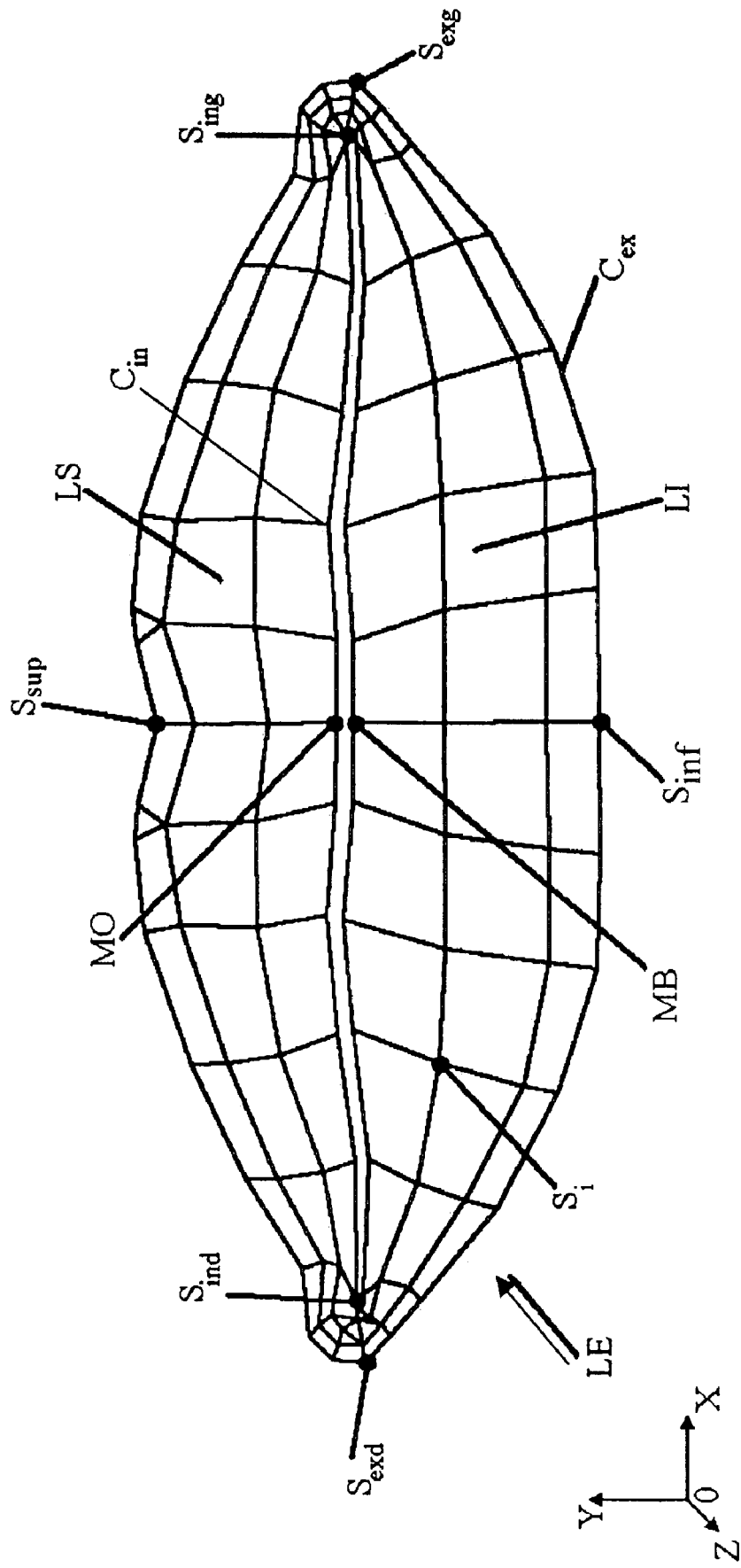
FIG. 4 is a meshed front view of the lips of the head.
Figure 5:
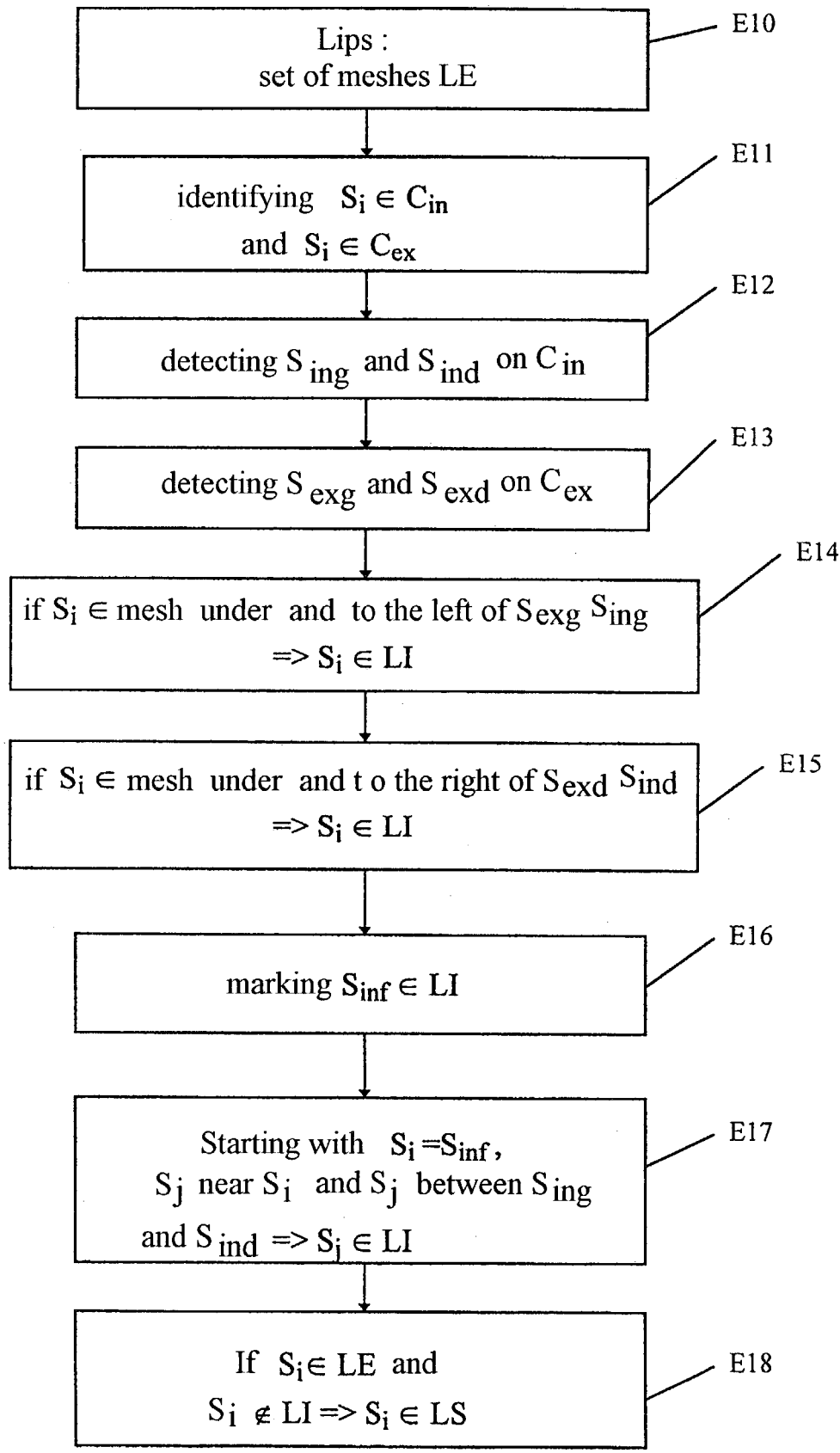
FIG. 5 is an algorithm for distinguishing between the upper and lower lips.

FIG. 4 shows in detail the set of triangular meshes LE comprising a lower lip LI and an upper lip LS, as seen in front view by projecting the set along the axis OZ onto the plane XOY. In accordance with the invention, the step E1 distinguishes the lower lip LI and the upper lip LS, by means of the algorithm shown in FIG. 5, in order to animate the lips separately. This lip distinction algorithm comprises steps E11 to E18. In an initial step E10 included in step E0, all the coordinates of the nodes of the triangular meshes of the set LE are known.

In the first step E11, the mesh nodes $S_i$ at the internal periphery of the set LE are identified to define the interior contour $C_{in}$ of the set of lips LE surrounding a slight opening of the mouth BO between the stationary lips and the corners at the ends of the lips. The mesh nodes at the external periphery of the set LE are identified to define the exterior contour $C_{ex}$ of the set LE of upper and lower lips passing through the corners of the lips.

In step E12, the laterally outermost nodes $S_{ing}$ and $S_{ind}$ along the abscissa axis OX, i.e. the leftmost and rightmost nodes, are detected on the interior contour $C_{in}$. Likewise, in step E13, the laterally outermost nodes $S_{exg}$ and $S_{exd}$ along the abscissa axis OX, i.e. the leftmost and rightmost nodes, are detected on the exterior contour $C_{ex}$; another node $S_{inf}$ corresponding to the smallest ordinate on the exterior contour $C_{ex}$ is also detected.

The pairs of left-hand nodes ($S_{ing}$, $S_{exg}$) and right-hand nodes ($S_{ind}$, $S_{exd}$) thus materialize the left and right corners of the lips.

Then all the mesh nodes to the left of the left node $S_{ing}$ of the internal contour in FIG. 4 and having an ordinate Y less than the left corner segment $S_{exg} S_{ing}$ having the ends previously detected are marked in step E14 as being nodes belonging to the lower lip LI. Likewise, all the mesh nodes to the right of the right-hand node $S_{ind}$ of the internal contour in FIG. 4 and having an ordinate Y less than the right corner segment $S_{exd} S_{ind}$ having the ends previously detected are marked in step E15 as being nodes belonging to the lower lip LI. Accordingly, in step E14 and E15 the mesh nodes below one of the corner segments $S_{exg} S_{ing}$ are marked as belonging to the lower lip LI.

In the next step E16, the lower node $S_{inf}$ is marked as being a node belonging to the lower lip LI.

In step E17, all the mesh nodes that have not been marked, i.e. that are not at the level of the mouth opening BO and have an abscissa X between the abscissae of the nodes of the internal contour of the lips $S_{ing}$ and $S_{ind}$, starting with two nodes near the lower node $S_{inf}$ of the lower lip LI and progressively inundating the lower lip, out to the lip corner segments, are marked recursively as belonging to the lower lip LI, until there are no more nodes to be marked.

Then, in step E18, all of the other nodes that have not been marked in the set of lips LE and that do not belong to the lower lip LI are marked as belonging to the upper lip LS. At this stage, the upper and lower lips LI and LS are separately defined by two sets of mesh nodes separated by the slight mouth opening OB between the lips and possibly by boundary points at the level of the corners considered to belong to the upper lip LS.

Referring to FIG. 3, the facial animation method continues with steps E2 and E3 for positioning and defining specialized facial muscles for opening the mouth which are modelled in a particular way and determining a lower zone ZI and an upper zone ZS in the head TE in order to limit the action of the specialized muscles and control independent animation of one lip relative to the other lip and thereby separation of the lips LI and LS.

Figure 6:
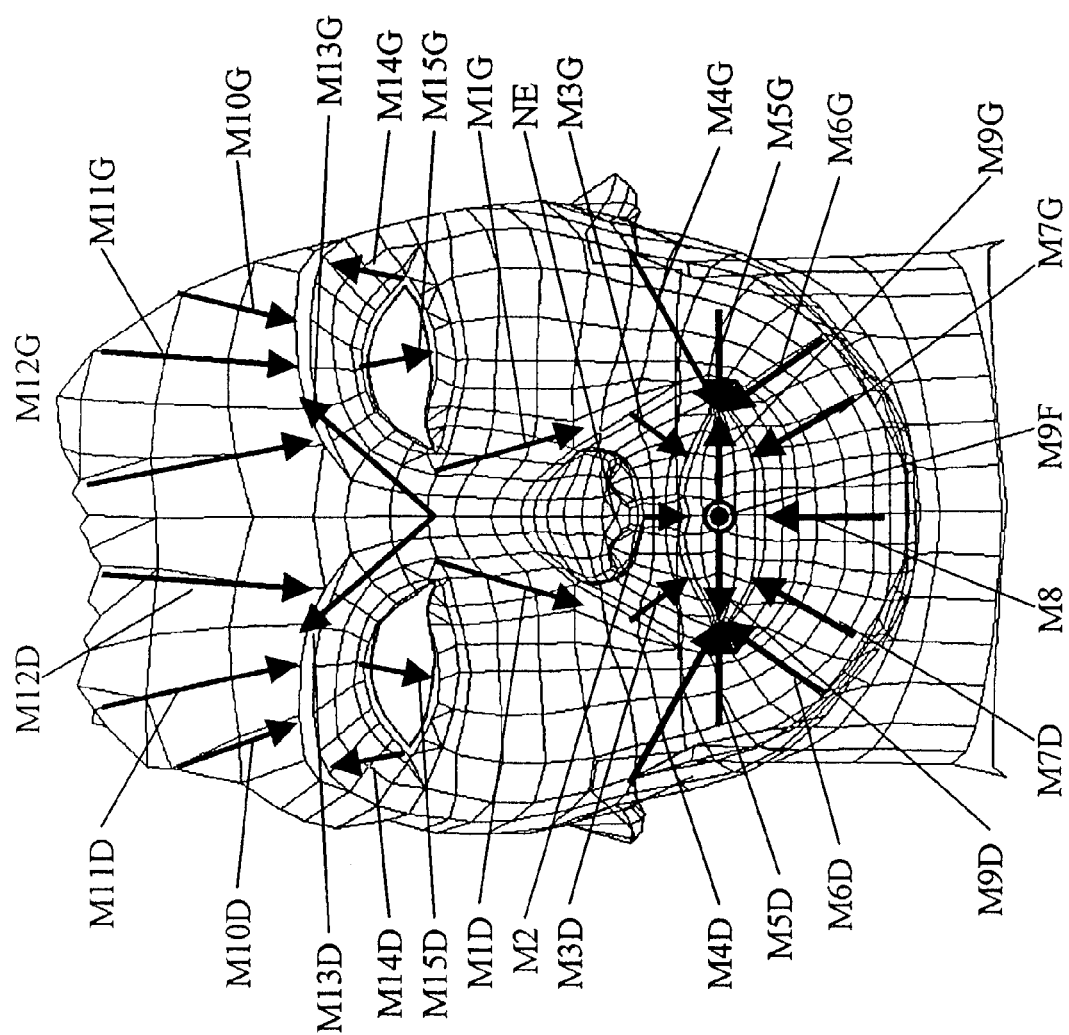
FIG. 6 is a front view analogous to FIG. 1, without the hair, showing the location of facial muscles.

As shown in FIG. 6 and set out in the FIG. 7 table, step E2 defines a group of 17 muscles controlling the movement of the lips in an area which is situated substantially under the nose and is symmetrical with respect to an anterior-posterior median plane AP of the head TE. As an alternative to this, step E2 can be executed after the initial step E0. The seventeen muscles are:

left and right internal nasal-labial muscles M1G and M1D extending obliquely downward along the alae of the nose;

a central labial levator muscle M2 whose attachment point is situated under the septum of the nose and which extends downward to the sub-nasal groove $S_{sup}$ of the upper lip LS (FIG. 4);

left and right internal nasal-labial muscles M3G and M3D whose attachment points are substantially at the root of the nostrils and extend substantially vertically downward to the external contour $C_{ex}$ substantially between the node $S_{sup}$ marking the sub-nasal groove and the corners of the lips;

left and right large zygomaticus muscles M4G and M4D attached substantially above the respective ears and extending obliquely substantially as far as the external nodes $S_{exg}$ and $S_{exd}$ at the corners of the lips;

right and left risorius muscles M5G and. M5D extending substantially horizontally from the middle of the cheeks to the external nodes at the corners of the lips;

left and right angular depressor muscles M6G and M6D extending substantially obliquely upward and laterally of the chin to the external nodes at the corners of the lips;

left and right triangular muscles M7G and M7D extending substantially vertically upward from the eminences of the chin to the external contour $C_{ex}$ of the lower lip LI between the lower node $S_{inf}$ and the external nodes at the corners of the lips;

a chin muscle M8 extending vertically from the cleft of the chin to the lower node $S_{inf}$ of the lower lip LI;

right, left and front orbicularis muscles M9G, M9D and M9F which have attachment points at the middle MO (FIG. 4) of the mouth opening which is situated between the facing central nodes on the internal contour $C_{in}$ and which are respectively directed toward the nodes $S_{ing}$ and $S_{ind}$ of the segment of the mouth opening OB and horizontally toward the interior of the mouth.

The three orbicularis muscles M9G, M9D and M9F constitute an annular muscle which acts as a sphincter around the mouth, centered on the middle MO, for example to simulate the enunciation of the letter O.

In accordance with the invention, the actions of the seventeen modelled muscles listed above and specializing in opening the mouth, to be more specific in animating the lips, are limited to respective determined zones of influence to enable separation of the lips. To obtain this separation, step E3 defines a lower zone ZI of the face and an upper zone ZS of the face in order to limit the action of some of these muscles to respective nodes of one or both zones ZI and ZS, as indicated in the right-hand column of the FIG. 7 table.

Figure 8:
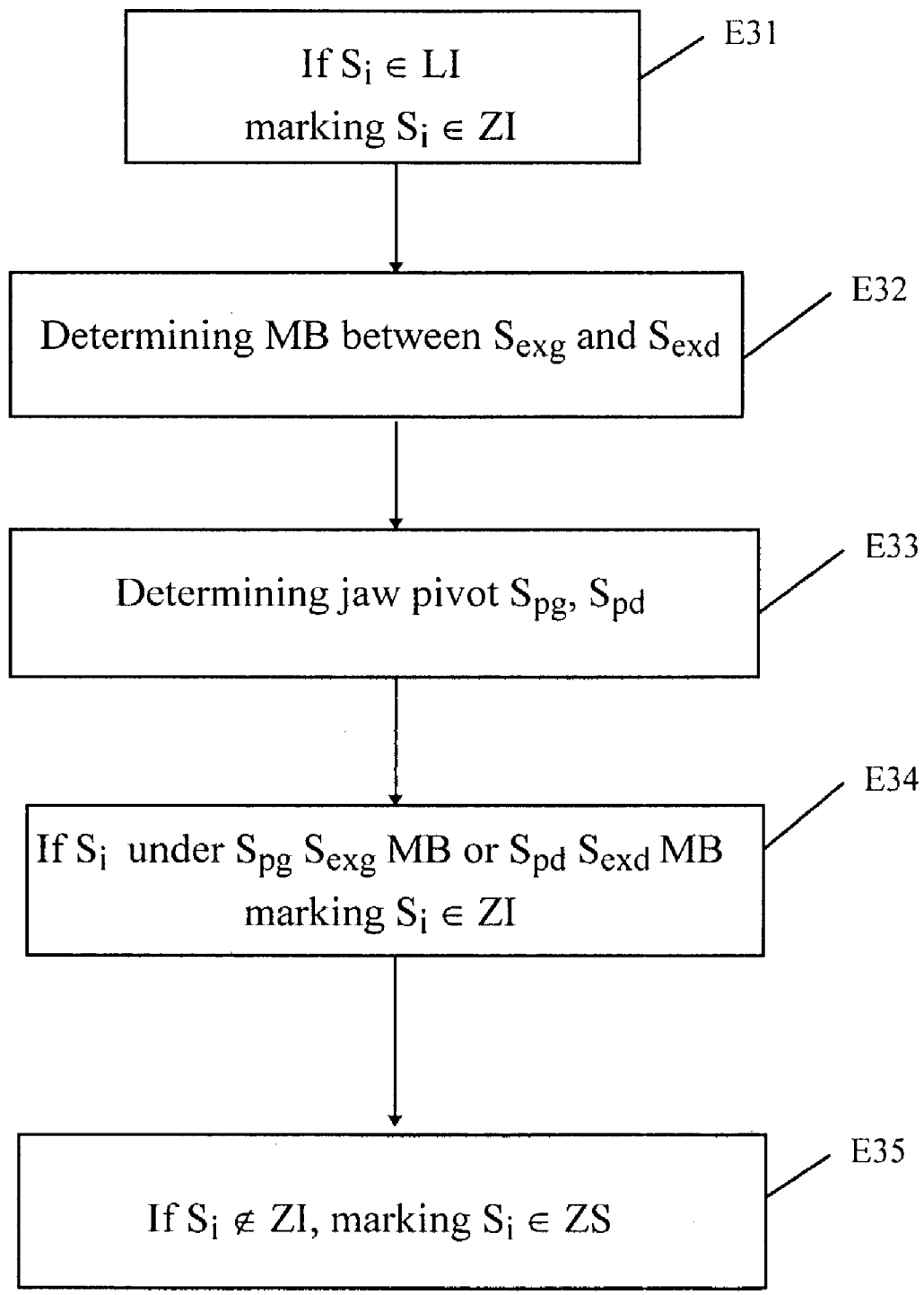
FIG. 8 is an algorithm included in the FIG. 3 algorithm for determining upper and lower zones of the head.
Figure 9:
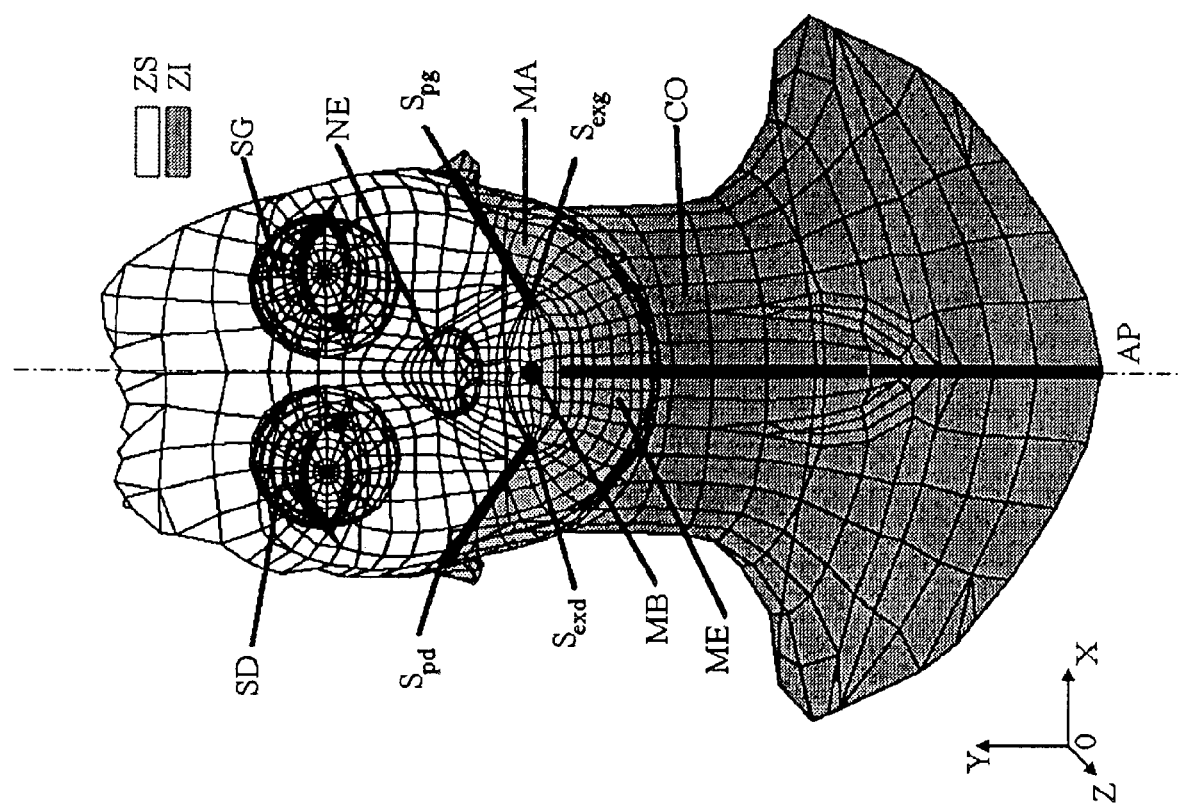
FIG. 9 is a view analogous to FIG. 1, without the hair, showing the separation between the upper and lower zones at the level of the lips.

As shown in detail in FIG. 8, which relates to FIG. 9, one of the two zones ZI and ZS, for example the lower zone ZI, is determined by five steps E31 to E35.

In step E31, all the mesh nodes $S_i$ of the lower lip LI in the set of meshes LE are marked as belonging to the lower zone ZI of the face. In step E32, the middle MB of the mouth is determined as being the middle of the segment between the external nodes $S_{exg}$ and $S_{exd}$ at the corners of the lips detected previously, in step E13 (FIG. 5), as being the outermost nodes on the exterior contour $C_{ex}$. Left and right jaw pivot axis nodes $S_{pg}$ and $S_{pd}$ are determined in step E33 substantially at the base of the ears to mark a horizontal pivoting axis of the jaws, in particular of the lower jaw, as shown in FIG. 2.

In the next step E34 all the mesh nodes $S_i$ of the head and in particular of the set of surface meshes referred to as the "facial epidermis", situated under the segment $S_{pg} S_{exg}$ on the left-hand profile projection (not shown) for the nodes to the left of the middle MB of the mouth, i.e. to the left of the anterior-posterior median plane AP of the head TE, are marked as belonging to the lower zone ZI. Similarly, all the nodes of the "facial epidermis" set of meshes situated under the segment $S_{pd} S_{exd}$ on the right-hand profile projection shown in FIG. 2, for the nodes to the right of the middle MB of the mouth, i.e. to the right of the anterior-posterior median plane AP of the head TE, are marked as belonging to the lower zone ZI. The lower zone is therefore situated under a broken line joining the pivot axis nodes $S_{pg} S_{pd}$ through the segment between the external corner nodes $S_{exg}$ and $S_{exd}$.

Then, in step E35, all the other mesh nodes of the head, in particular of the "facial epidermis" set, are marked as belonging to the upper zone ZS of the head.

In FIG. 9, the shaded mesh portion represents the lower zone ZI and the unshaded mesh portion represents the upper zone ZS.

As shown in the left-hand column of the FIG. 7 table, which relates to FIG. 6, the muscles M2, M3G and M3D above the upper lip LS are operative only in the upper zone ZS and the muscles M7G, M7D and M8 under the lower lip LI are operative only in the lower zone ZI, to move the lips toward and away from each other. The other muscles of the FIG. 7 table situated laterally of the mouth each move mesh nodes in the lower and upper zones at the same time to stretch and contract the lips laterally or obliquely.

Figure 10:
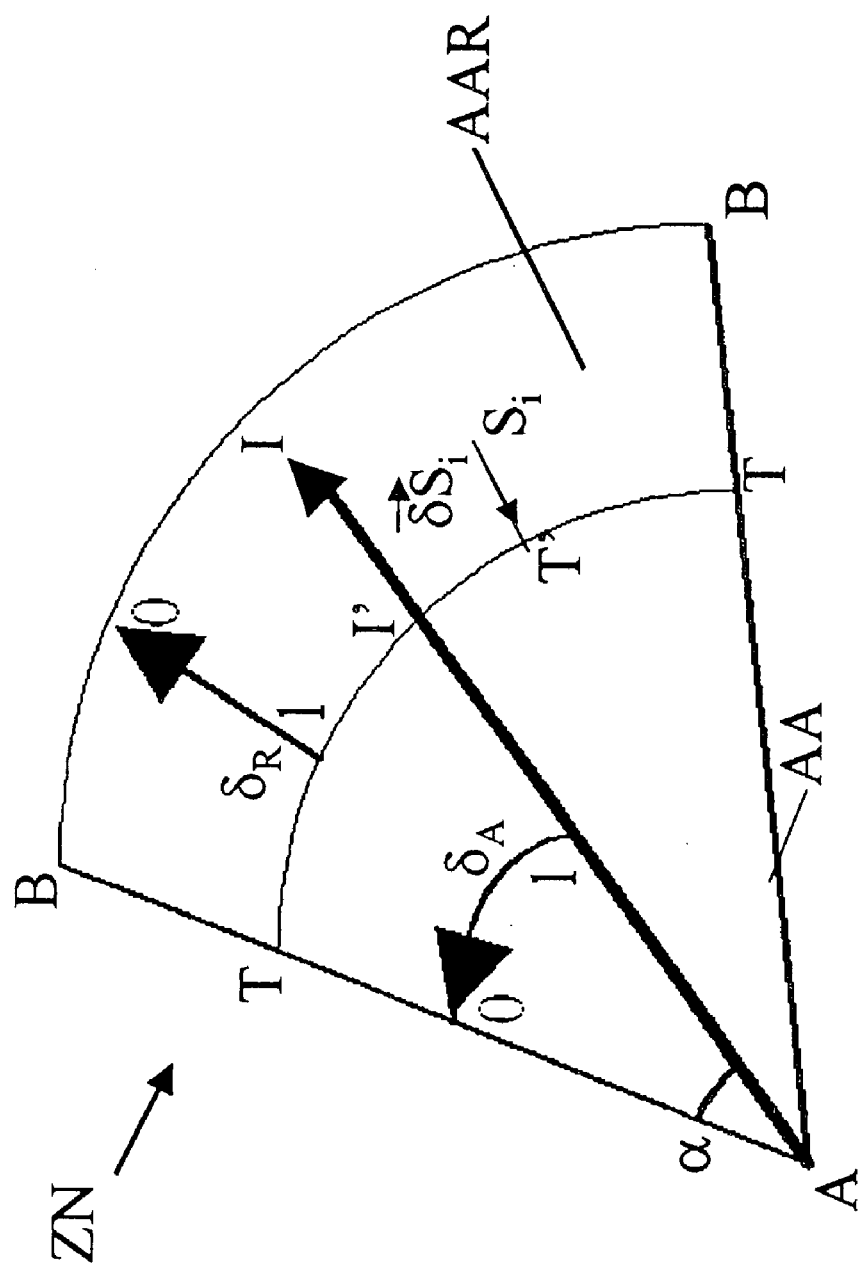
FIG. 10 is a graph of the zone of influence of a muscle and is used to explain the displacement of mesh nodes when the muscle contracts.

The invention adopts a muscular model, shown in FIG. 10, somewhat similar to that recommended by WATERS, taking account of the elasticity of the skin in the muscular contraction itself, which avoids long and fastidious computations.

A modelled muscle is attached to the meshed head by only two points, very often coinciding with mesh nodes, and which are represented by the origin and the oriented extremity of a muscle vector $$\vec{AI}.$$

Figure 11B:
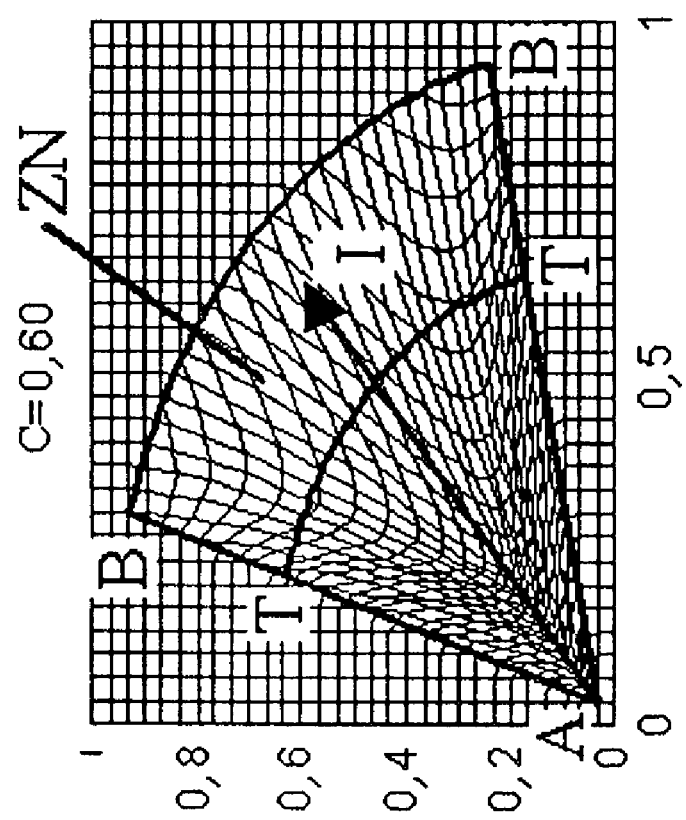
FIGS. 11A and 11B are graphs of a meshed zone of influence when the corresponding muscle is contracted 20% and 60%, respectively.
Figure 11A:
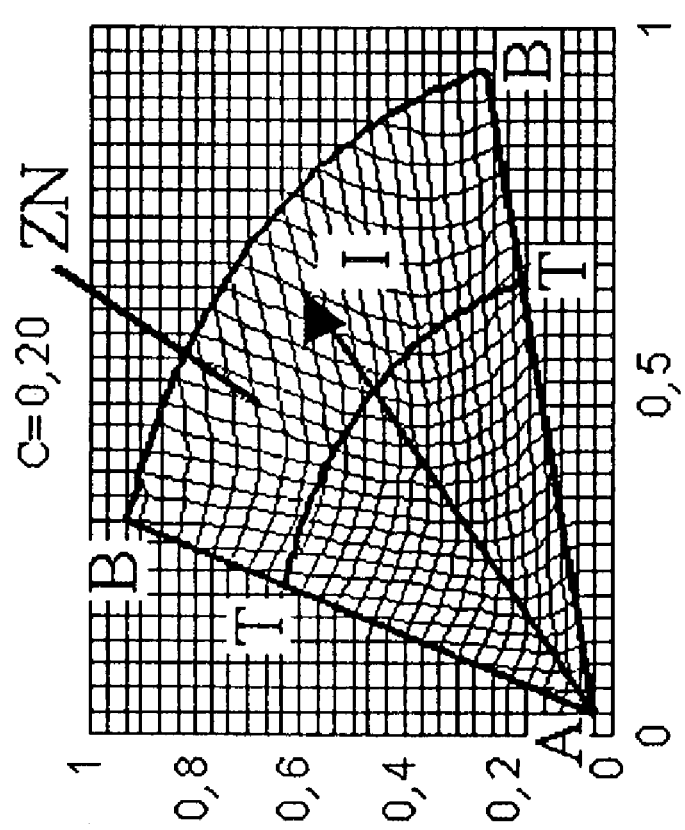

The origin of the vector constitutes a point of attachment A of the muscle considered as the root of the muscle, since from a biological point of view it is attached to the bones of the head TE. The oriented extremity constitutes a point of insertion I of the muscle into the tissue. During contraction, the point of attachment A and the point of insertion I remain stationary and the muscle acts like a convergent magnetic field, attracting the mesh nodes $S_i$ situated in a conical zone of influence ZN near the vector $$\vec{AI}$$

in the direction of the origin A of the vector, as can be seen in FIGS. 11A and 11B for 20% and 60% contractions of the muscle modelled in accordance with the invention. The zone of influence ZN of the muscle corresponds to a circular cone with generatrices AB, an axis along the vector $$\vec{AI},$$

a cone angle α and a spherical base BB with center A. The conical zone of influence ZN contains the whole of the vector $$\vec{AI},$$

as shown in FIG. 10.

The modelled muscle vector $$\vec{AI}$$

in the zone of influence ZN is defined by the following parameters:
- a circular aperture angle α which defines, for an angle β=IAS$_i$ relative to the direction of the vector of displacement $$\vec{\delta S_i}$$

of a mesh node S$_i$ relative to the axis AI of the zone of influence ZN, the limit not to be exceeded for the node S$_i$ to be moved in the zone of influence ZN of the muscle upon contraction thereof;
  - a zone of angular and radial attenuation AAR of the contraction of the muscle delimited by a frustum of a cone with generatrices TB and concentric spherical bases TT and BB, situated at the spherical periphery of the zone of influence ZN and containing the oriented extremity I of the vector $$\vec{AI}$$

with a predetermined width TB within which the mesh nodes S$_i$ are moved by the muscle more and more when the node S$_i$ is situated near the point of intersection I' of the muscular segment AI and the smaller base TT;
  - a zone of angular attenuation AA of the contraction of the muscle delimited by a cone between the node A and the smaller base TT, inside which the mesh nodes S$_i$ are moved by the muscle more and more when the node S$_i$ is situated near the muscle segment AI and the node A.

The nodes S$_i$ on the periphery of the zone of influence ZN, i.e. on the conical surface with generatrix AB and on the spherical larger base BB, are stationary during contraction of the muscle. If the angle β=IAS$_i$ increases until it is equal to the angle α, an attenuation δ of the displacement is more and more dominant (δ≈0), which prevents an exaggerated boundary appearing between the nodes that are displaced and their neighbors that are not. The displacement of a mesh node S$_i$ is computed by adding a displacement vector $$\vec{\delta S_i}$$

in the opposite direction to the vector $$\vec{AS_i}$$

to the coordinates X, Y, Z of the node S$_i$ in accordance with the following equation:

$$\vec{\delta S_i} = -C \cdot \delta \cdot \vec{AS_i},$$

in which C is a percentage of contraction of the muscle and δ is an attenuation coefficient equal to the product of an angular attenuation coefficient δ$_A$ and a radial attenuation coefficient δ$_R$, which are defined as follows:

$$\delta_A = \frac{\cos\beta - \cos\alpha}{1 - \cos\alpha}$$

$$\delta_R = \cos((\|T'S_i\|/\|TB\|))\ (\pi/2)$$

where δ=δ$_A$·δ$_R$ if $\|AS_i\| > \|AT\|$
and δ=δ$_A$ and δ$_R$=1 if $\|AS_i\| \leq \|AR\|$,
and T' is the intersection of AS$_i$ with the base TT.

The attenuation coefficient δ$_A$ is specific to the invention and depends on the angular distance β between the vectors $$\vec{AS_i}$$

and $$\vec{AI}.$$

The maximum contraction, i.e. the contraction when $$\vec{\delta S_i} = -C \cdot \vec{AS_i},$$

is obtained uniquely for the nodes included in the segment AI' where β0 and δ$_A$=δ=1, the point I' being the node that can be displaced farthest. The attenuation coefficient δ$_R$ is a function of the radial distance between the points S$_i$ and T' and varies only in the frustoconical area AAR, between 0 and 1 and from the smaller base TT toward the larger base BB.

As can also be seen in FIG. 6, other modelled facial muscles located on the forehead are provided for animating the left and right eyebrows SG and SD. The modelled muscles listed in the FIG. 12 table are:

left and right external frontal muscles M10G and M10D, left and right frontal muscles M11G, M11D, and left and right large frontal muscles M12G and M12D which are attached to the forehead and respectively extend downward substantially as far as the external, middle and internal extremities of the left and right eyebrows SG and SD;

left and right lateral corrugator muscles M13G and M13D which are attached substantially laterally to the top of the nose and directed upward, respectively as far as the left and right eyebrows, between the points of attachment of the muscles M11G-M12G and M11D-M12D;

left and right lower orbicularis muscles M14G and M14D and left and right upper orbicularis muscles M15G and M15D which are respectively attached to the external corners of the eyes and to the middle of the upper eyelids PAG and PAD, and which respectively extend upward substantially toward the external extremities of the eyebrows and downward substantially toward the middles of the lower eyelids, to lower the exterior extremities of the eyebrows and raise the eyelids.

As already stated, when a muscle acts on a mesh node $S_i$, it generates a displacement vector $\overrightarrow{\delta S_i}$ which must be added to the coordinates of the node $S_i$ to obtain the displaced node. However, if a mesh node $S_i$ is situated in more than one intersecting zones of influence of muscle, and is therefore subjected to the action of all those muscles, adding displacement vectors without taking appropriate precautions may generate an exaggerated displacement of the mesh node resulting from the addition of the vectors. The displaced node may be attracted farther than the points of attachment of the modelled muscles that contribute to the displacement.

Figure 13B:
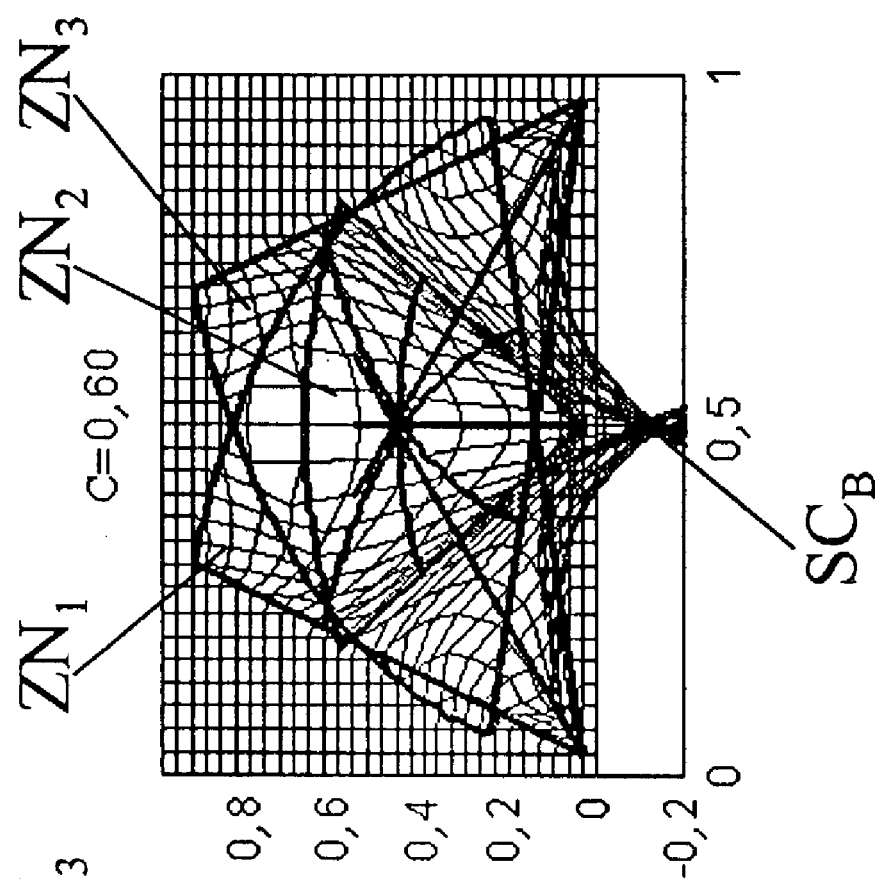
FIGS. 13A and 13B show the influence of three muscles, respectively after a 20% contraction and a 60% contraction, on the displacements of mesh nodes common to their zones of influence, in order to demonstrate the impossibility of displacing mesh nodes that the invention avoids.
Figure 13A:
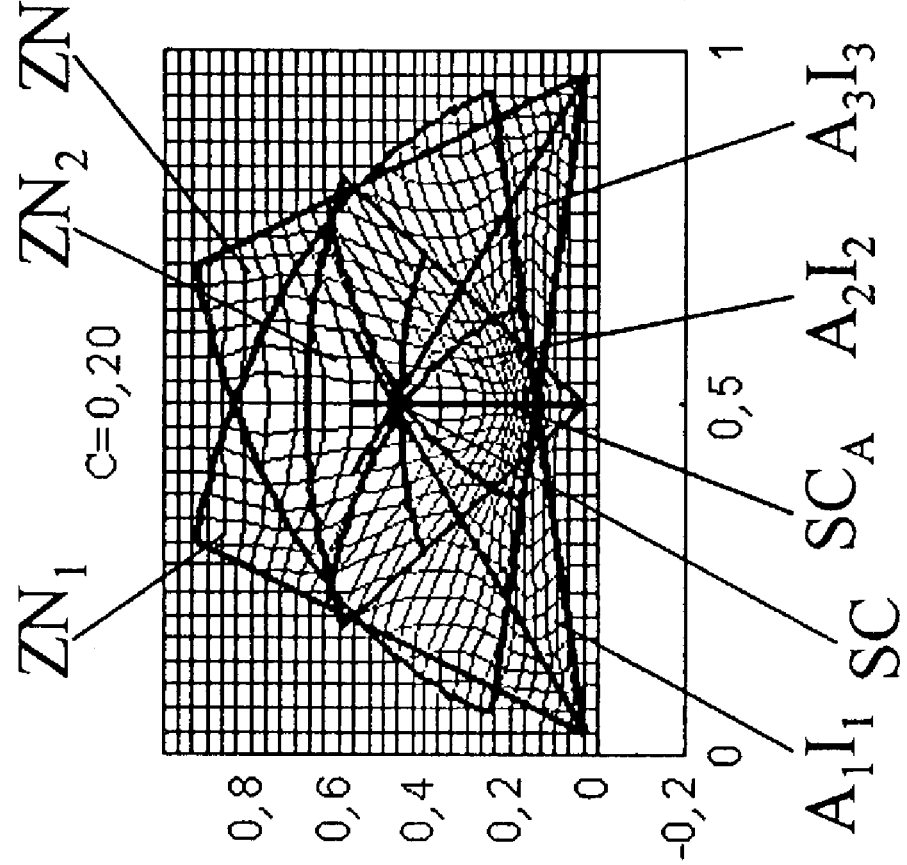

For example, three muscles $$\overrightarrow{A_1 I_1}, \overrightarrow{A_2 I_2}$$

and $$\overrightarrow{A_3 I_3}$$

have intersecting zones of influence $ZN_1$, $ZN_2$ and $ZN_3$ shown in FIG. 13A. The muscle vectors of these three muscles meet at a common mesh node SC. The addition of the action of these three vectors on the common mesh nodes, such as the node SC, common to the three zones of influence, with a contribution of C=20% for each of them, keeps the displaced nodes $SC_A$ in the zones of influence. On the other hand, if the percentage of contraction C is higher, for example equal to 60%, as shown in FIG. 13B, applying resultant vectors obtained by adding the contributions of the three muscles $A_1 I_1$, $A_2 I_2$ and $A_3 I_3$ to the common mesh nodes, such as the node SC, generates displaced nodes $SC_B$ that are drawn out of the zones of influence $ZN_1$, $ZN_2$ and $ZN_3$, which is impossible in practice.

To overcome this problem, step E4 classifies the modelled facial muscles to constitute groups G1 to G5 according to their orientation, as shown in the FIG. 14 table.

The first group G1 comprises the muscles M2, M3G, M3D, M4G and M4D attached to the upper lip LS and having zones of influence intersecting at least two by two between adjoining muscles to displace mesh nodes $S_i$ in the lip LS and under the nose NE. The second group G2 comprises the muscles M6G, M6D, M7G, M7D and M8 attached to the lower lip LI and having zones of influence intersecting at least two by two between adjoining muscles to displace mesh nodes $S_i$ in the lip LI and the chin ME. The third group G3 comprises the left frontal muscles M10G, M11G, M12G and M15G situated substantially in the left frontal portion and having zones of influence intersecting at least two by two, in an analogous manner to FIG. 13A, to displace frontal mesh nodes $S_i$ substantially in and/or above the eyebrow SG and/or the eyelid PAG. Similarly, the fourth group G4 comprises the right frontal muscles M10D, M11D, M12D and M15D respectively symmetrical to the muscles M10G, M11G, M12G and M15G.

In each of the first four groups G1, G2, G3 and G4, the displacement vector of a mesh node $S_i$ is determined by adding the displacement vectors resulting from the action of the muscles of the group able to act on the mesh node $S_i$ to obtain a resultant vector which is then truncated so that the modulus of the resultant vector is equal to the highest modulus of the displacement vectors of the muscles that have to act.

For example, if the aforementioned three muscles $A_1 I_1$, $A_2 I_2$ and $A_3 I_3$ shown in FIGS. 13A and 13B belong to one of the four groups G1 to G4 and have zones of influence $ZN_1$, $ZN_2$ and $ZN_3$ containing in common at least one mesh node $S_i$, for example like the muscles M3D, M2 and M3G in the first group G1, or the muscles M7D, M8 and M7G in the second group G2, the node $S_i$ is displaced in accordance with the invention by a vector having the same direction as the resultant vector equal to the sum of the displacement vectors $$\overrightarrow{\delta S_{i1}}, \overrightarrow{\delta S_{i2}}$$

and $$\overrightarrow{\delta S_{i3}}$$

of the three muscles, in other words:

$$\overrightarrow{\delta S_i} = \overrightarrow{\delta S_{i1}} + \overrightarrow{\delta S_{i2}} + \overrightarrow{\delta S_{i3}}$$

$$\overrightarrow{\delta S_i} = -C_1 \cdot \delta_1 \cdot \overrightarrow{A_1 S_i} - C_2 \cdot \delta_2 \cdot \overrightarrow{A_2 S_i} - C_3 \cdot \delta_3 \cdot \overrightarrow{A_3 S_i}$$

and having the same modulus as the vector $$\overrightarrow{\delta S_i}$$

if:

$$\|\overrightarrow{\delta S_i}\| \le sup(\|\overrightarrow{\delta S_{i1}}\|, \|\overrightarrow{\delta S_{i2}}\|, \|\overrightarrow{\delta S_{i3}}\|)$$

and a modulus equal to the highest of the three moduli, denoted "sup", otherwise. In the foregoing equations, $C_1$, $C_2$ and $C_3$ designate respective contractions of the three muscles $A_1I_1$, $A_2I_2$ and $A_3I_3$, and $\delta_1$, $\delta_2$ and $\delta_3$ designate attenuation coefficients respectively depending on the location of the node $S_i$ in the zones of influence $ZN_1$, $ZN_2$ and $ZN_3$.

The last group G5 comprises various muscles and in particular modelled muscles M4G, M4D, M5G, M5D, M6G, M6D, M9G, M9D and M9F having zones of influence for displacing each of the nodes which are partly in the upper zone ZS substantially above the lower lip LI and partly in the lower zone ZI substantially below the upper lip LS, which enables these muscles to stretch and contract the lips.

The group G5 also comprises muscles which are chosen so that either a node can be in the zone of influence of only one muscle or the displacements are orthogonal. The group G5 thus comprises modelled muscles M5G and M5D respectively attached to the corners of the lips $S_{exg}$ and $S_{exd}$ and having independent zones of influence for respectively and independently displacing mesh nodes in opposite directions toward the exterior of the corners of the lips $S_{exg}$ and $S_{exd}$, and modelled muscles M9G, M9D and M9F attached to the middle of the mouth and having independent zones of influence for respectively and independently displacing mesh nodes toward the corners of the lips $S_{exg}$ and $S_{exd}$ and toward the inside of the mouth.

Figure 16:
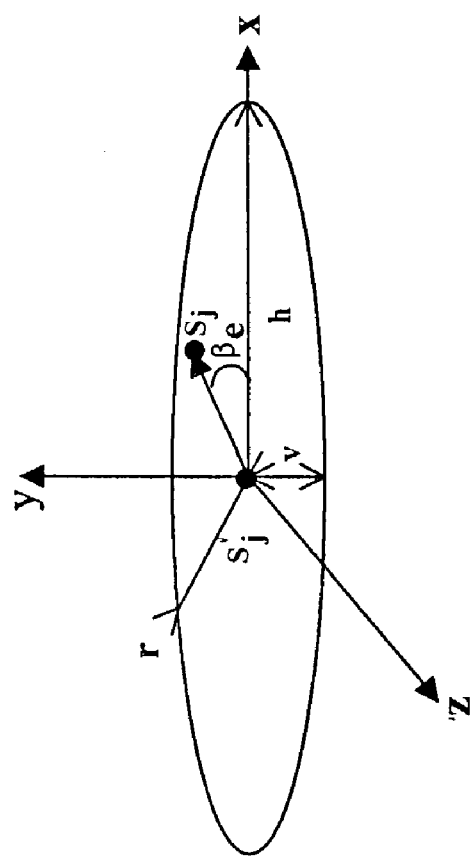
FIGS. 15 and 16 are graphs in axial section of a variant ellipsoid-based zone of influence of a muscle, respectively in a plane containing the vector modelling the muscle and in a plane perpendicular to that vector.
Figure 15:
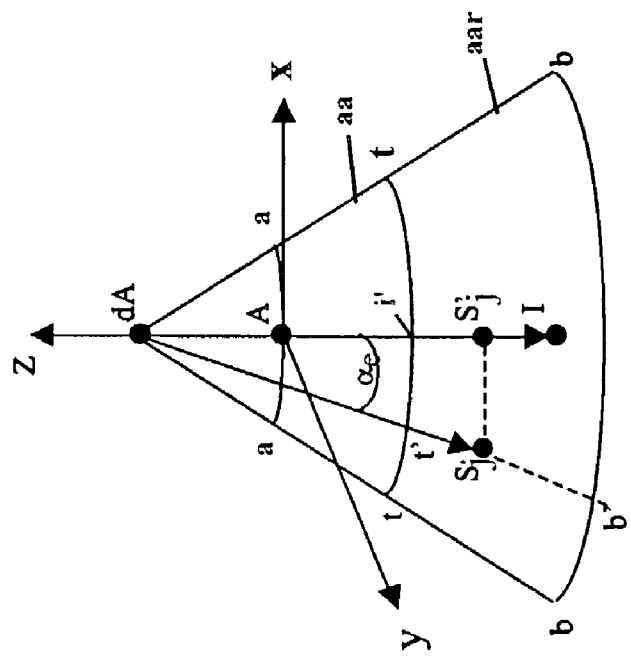
Figure 17:
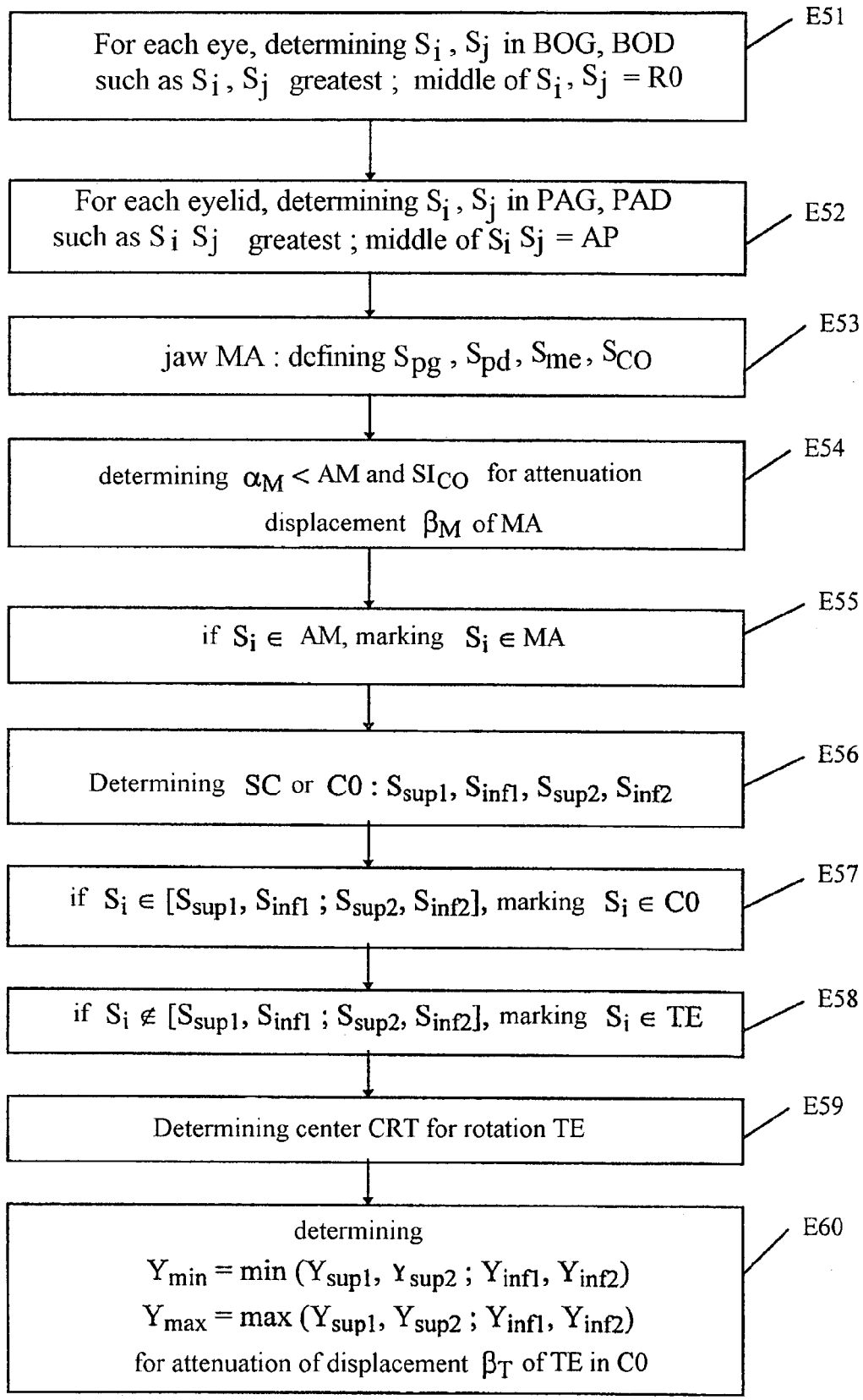
FIG. 17 is an algorithm for determining parameters for animating eyes, eyelids, a lower jaw and a neck of the head.

As an alternative to the above, a modelled muscle vector $$\overrightarrow{AI},$$

whose points of attachment are the origin A and the oriented extremity I of the vector, is defined by parameters in a zone of influence zn with an elliptical base, as shown in FIGS. 15 and 16. The parameters are substantially similar to those defined for the zone of influence ZN shown in FIG. 10, and are designated hereinafter by the corresponding lowercase letters. They are, in addition to the two attachment points:

a displacement "disp" toward the rear of the origin A of the vector $$\overrightarrow{AI}$$

away from the oriented extremity I, to a point dA such that: disp $$\overrightarrow{AI} = A - dA$$

so that, for short muscles in particular, the forces do not converge in a very dense manner toward the origin A, but seem to converge toward the "rear" point dA;

two elliptical aperture angles $\alpha_{eh}$ and $\alpha_{ev}$ in the planes xz and yz due to the elliptical contour sections of the zone of influence zn perpendicular to the direction of the vector $\overrightarrow{AI}$, and to the ellipsoidal base bb terminating the zone of influence zn in front of the extremity I; if 2h and 2e denote the major axis and the minor axis of an elliptical section with center $S'_j$ on the vertical axis Z colinear with the segment AI, and $S_j$ a mesh node at the same level as $S'_j$ in the zone of influence zn, the coordinates x and y of the node $S_j$ are such that:

$$(x^2/h^2)+(y^2/v^2)=1$$

i.e. with $\beta_e = \text{IdAS}_j$ relative to the direction of the displacement vector $$\overrightarrow{\delta S_j}$$

of the node $S_j$ relative to the axis z of the zone of influence:

$$r^2 = (S_j S'_j)^2 = 1/[\sin^2\beta_e/h^2 + \cos^2\beta_e/v^2]$$

$$h = \|dAS'_j\| tg\alpha_{eh}$$

$$v = \|dAS'_j\| tg\alpha_{ev}$$

a zone of angular and radial attenuation aar of the contraction of the muscle delimited by a frustum of a cone with generatrix tb and concentric ellipsoidal bases tt and bb, situated at the ellipsoidal periphery of the zone of influence zn and containing the oriented extremity I of the vector $$\overrightarrow{AI},$$

and with a predetermined width tb within which the mesh nodes $S_j$ are displaced by the muscle more and more when the node $S_j$ is situated near the point of intersection i' of the muscular segment AI and the smaller base tt;

a zone of angular attenuation aa of the contraction of the muscle delimited by a frustum of a cone with a smaller base aa around the origin A and an intermediate base tt, within which the mesh nodes $S_j$ are displaced by the muscle more and more when the node $S_j$ is situated near the muscular segment AI and the node A.

It will be noted that the conical area having the base aa and the apex dA does not belong to the zone of influence zn.

The nodes $S_j$ at the periphery of the zone of influence zn, i.e. on the conical surface with the generatrix ab and on the spherical larger base bb, are stationary when the muscle contracts. If the radial distance $S'_j S_j$ increases until it is equal to the radius of the corresponding elliptical section, an attenuation $\delta_e$ of the displacement is more and more dominant ($\delta_e \approx 0$), which prevents an exaggerated boundary appearing between the nodes that are displaced and their neighbours that are not. The displacement of a mesh node $S_j$ is computed by adding a displacement vector $$\overrightarrow{\delta S_j}$$

in the opposite direction to the vector $$\overrightarrow{dAS}_j$$

to the coordinates x, y, z of the node $S_j$, in accordance with the following equation:

$$\overrightarrow{\delta S}_j = -C_e \cdot \delta_e \cdot \overrightarrow{dAS}_j,$$

in which $C_e$ is a percentage of contraction of the muscle and $\delta_e$ is a coefficient of attenuation equal to the product of an angular attenuation coefficient $\delta_{eA}$ and a radial attenuation coefficient $\delta_{eR}$ defined as follows:

$\delta_{eA} = (r^2 - \|S'_j S_j\|)/r^2$ $\delta_{eR} = (\|AI\|/\|dAI\|) \cos [((\|dAS_j\| - \|dAt'\|)/(\|dAS'_j\| - \|dAt'\|))(\pi/2)]$ with $\delta_e = \delta_{eA} \cdot \delta_{eR}$ if $\|dAS_j\| > \|dAt\|$
and $\delta_e = \delta_{eA} = \|AI\|/\|dAI\|$ and $\delta_{eR} = 1$ if $\|dAa\| \leq \|dAS_j\| \leq \|dAt\|$ and t' the intersection of $dAS_j$ with the base tt.

The modelled muscle with zone of influence zn functions in an analogous manner to the modelled muscle with the zone of influence ZN.

In a hybrid variant, the muscles of the head are defined partly with a zone of influence ZN (FIG. 10) and partly with a zone of influence zn (FIGS. 15 and 16).

Facial animation in accordance with the invention also includes parametric animation of other organs such as the eyes and the upper eyelids, the lower jaw and the neck, whose parameters are defined in step E5 (FIG. 5), which is shown as following on from the association step E4, although it can be executed before this, for example after the initial step E0.

In the initial step E0, the sets of meshes relating to the eyes, i.e. to the whites BOG of the left eye and BOD of the right eye respectively containing the left iris and pupil and the right iris and pupil, and relating to the left and right eyelids PAG and PAD, are perfectly defined. The sets BOG, BOD are assumed to be substantially hemispheres, and the sets PAG and PAD portions of a sphere.

To animate a given eye, for example the right eye BOG, a rotation center RO of the eye and a rotation axis AP of the corresponding eyelid PAD are searched for in steps E51 and E52 shown in FIG. 15.

Step E51 searches automatically for two mesh nodes $S_i$ and $S_j$ that are farthest apart in the set of meshes relating to the white BOG of the corresponding eye. The two nodes $S_i$ and $S_j$ that are farthest apart define the extremities of a segment forming a diameter of the half-sphere of the eye and the middle of the diametral segment joining these two nodes defines the rotation center RO of the eye. Step E51 is repeated for each eye. Since the face at rest is parallel to the plane XOY in a front view and parallel to the plane YOZ in a side view, each eye can rotate about the respective center RO and around the axes OX and OY to simulate looking upward and/or downward and/or to the right or to the left.

Step E52 determines a rotation axis AP of the corresponding upper eyelid automatically and in a similar fashion, by searching for two mesh nodes $S_i$ and $S_j$ that are farthest apart in the corresponding set of meshes PAD. The rotation axis about which the set of meshes PAD can turn to simulate opening and closing of the eyelid passes through these two mesh nodes. Step E52 is repeated for the other eyelid PAG.

Animation of the lower jaw MA operates on set's of meshes relating to the facial epidermis.

Step E53 determines mesh nodes with reference to FIG. 2 as:

two jaw pivot axis nodes $S_{pg}$ and $S_{pd}$ that are generally coincident in side view (FIG. 2), if they have not been determined already in step E33 (FIG. 8), a chin node $S_{me}$ situated in the median anterior-posterior plane of the head TE and substantially at the origin of the chin cleft, and a head-neck transition node $S_{CO}$ substantially in the anterior-posterior median plane and at the apex of the angle between the underside of the chin and the anterior part of the neck.

These three mesh nodes define a jaw articulation angular sector AM with nodes $S_{pd}(S_{pg})$ and sides $S_{pd} S_{me} (S_{pg} S_{me})$ and $S_{pd} S_{CO}$.

Step E54 then determines a predetermined angular sector $\alpha_M$ less than the jaw articulation sector AM=$S_{me} S_{pd} S_{CO}$=$S_{me} S_{pg} S_{CO}$, contained in the sector AM from the common lower side $S_{pd} S_{CO}$, as shown in FIG. 2. A node $S1_{CO}$ is defined at the intersection of the upper side of the angle $\alpha_M$ and the chin.

The lower jaw MA is then defined in FIG. 2 by the angular sector AM formed by the sides $S_{pd} S_{me}$ and $S_{pd} S_{CO}$ of the articulation angle AM.

In step E55, the nodes $S_i$ of the set of "facial epidermis" meshes substantially contained within the articulation angular sector AM are marked as belonging to the jaw MA. The mouth is not affected by the rotation of the jaw and is animated only by the muscles already defined with reference to FIGS. 6 and 7.

The jaw turns about the axis $S_{pd} S_{pg}$ parallel to the axis OX, as shown in FIG. 9. To prevent the jaw MA colliding with the neck CO, the rotation of the jaw is progressively retarded in the downward direction for mesh nodes in the facial epidermis and buccal cavity sets that are within the angular sector $\alpha_M$, until it becomes zero in the vicinity of the segment $S_{pd} S_{CO}$. The angular segment $\alpha_M$ defines the area in which the rotation of the jaw is attenuated.

Subsequently, a rotation $\beta_M$ of the jaw MA, typically of less than 10° or 15°, operates completely ($\beta' = \beta_M$) on the mesh nodes $S_i$ situated within the angular sector AM$-\alpha_M =$ [$S_{me} S_{pd} S1_{CO}$] in the upper part of the articulation sector AM and in an attenuated manner on the mesh nodes $S_i$ within the angular sector $\alpha_M$. When the angular distance $\alpha_i = [S_{CO} S_{pd} S_i]$ between the mesh node $S_i$ and the lower side $S_{pd} S_{me}$ common to the angular sectors AM and $\alpha_M$ decreases, the angular displacement $\beta_M$ of the node $S_i$ initially provided for the jaw decreases as a function of an attenuation coefficient $\delta_M$ in order for the angular displacement $\beta'_M$ of the node in the sector $\alpha_M$ to be as follows:

$\beta'_M = \beta_M \cdot \delta_M$ with $\delta_M = 1 - \cos\left(\dfrac{\alpha_i}{\alpha_M} \dfrac{\pi}{2}\right)$ for $S_i \in \alpha_M$.

The neck Co is uniquely a portion of the set of "facial epidermis" meshes. Step E56 determines the neck using the next four nodes of this set in the anterior-posterior median plane AP of the head:

upper and lower anterior nodes $S_{sup1}$ and $S_{inf1}$ situated along the anterior profile of the neck and substantially below the node $S_{CO}$ and above the origin of the bust BU, and upper and lower posterior nodes $S_{sup2}$ and $S_{inf2}$ along the posterior profile of the neck and substantially at the level of the middle MB of the mouth and above the origin of the back.

The next step E57 marks the mesh nodes $S_i$ of the set of "facial epidermis" meshes as belonging to the neck CO if they are substantially between the lateral planes passing through the upper nodes $S_{sup1}$ and $S_{sup2}$ and the lower nodes $S_{inf1}$, and $S_{inf2}$. Then, in step E58, all the other nodes of the "facial epidermis" set that do not belong to the neck, along with all the other nodes in all the other sets of meshes of the head, with the exception of the lower set relating to the bust BU, are explored above the upper anterior node $S_{sup1}$ to be marked as belonging to the head TE.

Step E59 automatically determines a center of rotation CRT of the head coinciding with the center of the volume encompassing the mesh nodes belonging to the neck CO. Although the center of rotation CRT is substantially in front of the real center of rotation of the head, the visual effect of the rotation of the head obtained in this way is satisfactory.

The rotation of the head is associated with an attenuation of the rotation at the level of the neck between the trace planes $S_{sup1}$ $S_{sup2}$ and $S_{inf1}$ $S_{inf2}$ Step E60 determines minimum and maximum ordinates $Y_{min}$ and $Y_{max}$ of the nodes $S_{sup1}$, $S_{sup2}$, $S_{inf1}$ and $S_{inf2}$ defining the neck as a function of the ordinates $Y_{sup1}$, $Y_{sup2}$, $Y_{inf1}$, and $Y_{inf2}$ of these four nodes, such that:

$$Y_{min}=\min(Y_{sup1}, Y_{sup2}, Y_{inf1}, Y_{inf2})$$

$$Y_{max}=\max(Y_{sup1}, Y_{sup2}, Y_{inf1}, Y_{inf2})$$

A subsequent rotation $\beta_T$ of the head TE, typically of less than 10° to 15°, operates completely ($\beta'_T=\beta_T$) on the mesh nodes situated above the lateral plane passing through the upper nodes $S_{sup1}$ and $S_{sup2}$ and in an attenuated fashion on the mesh nodes $S_i$ within the neck CO. The closer the mesh node $S_i$ to the lateral plane of the neck passing through the lower nodes $S_{inf1}$, and $S_{inf2}$, the greater the angular displacement $\beta_T$ of the mesh node $S_i$ initially provided for the head TE decreases as a function of the ratio between the difference between the ordinate $Y_{Si}$ of the mesh node $S_i$ and the minimum ordinate and the maximum height $(Y_{max}-Y_{min})$ of the neck, in order for the displacement $\beta'_T$ of the node $S_i$ in the neck to be as follows:

$$\beta'_T=\beta_T\delta_T$$

$$\delta_T = \frac{(Y_{Si} - Y_{min})}{(Y_{max} - Y_{min})}$$

Two embodiments of an interactive client-server system for implementing the facial animation method according to the invention are described by way of example hereinafter.

Figure 18:
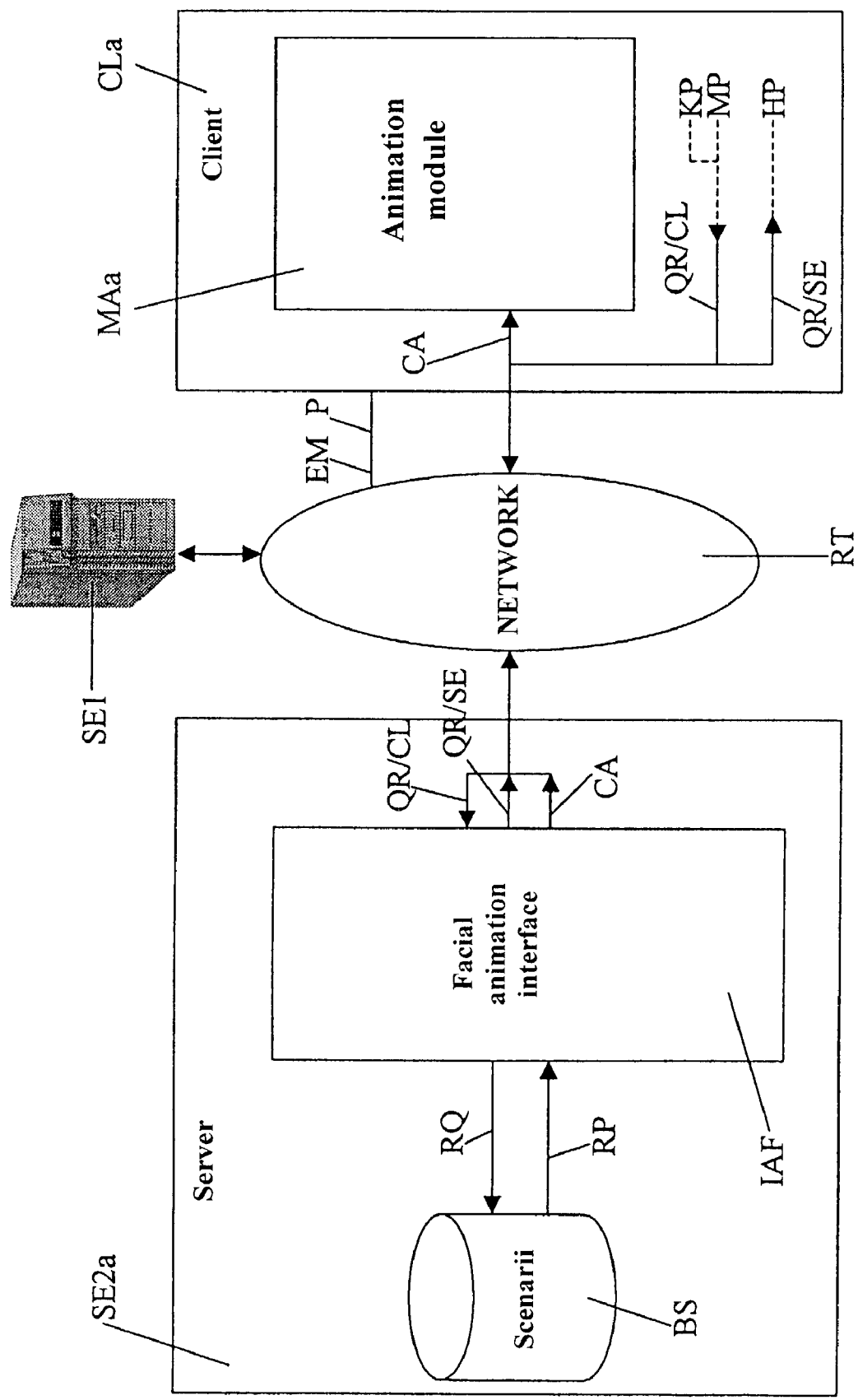
FIGS. 18 and 19 are block diagrams of two embodiments of a client-server system for facial animation in accordance with the invention.

In a first embodiment intended for teaching, and shown in FIG. 18, the client CLa is a pupil's microcomputer including an animation module MAa constituting a processor in which a facial animation engine according to the invention is implemented. The animation module MAa has previously acquired sets of meshes EM and parameters P of the head TE of a "teacher" that are downloaded from a server SE1 offering the pupil a plurality of teacher heads. These sets of meshes and parameters defining the head of the teacher and downloaded into the module MAa are some or all of the following:

sets of meshes EM modelling the head of the teacher in three dimensions using the Virtual Reality Modelling Language (VRML), and parameters P necessary for defining the parametric and muscular animations already defined in the foregoing description:

jaw: $S_{pd}(S_{pg})$, $S_{me}$, $S_{CO}$, $\alpha_M$ (FIG. 2);

neck: $S_{inf1}$, $S_{inf2}$, $S_{sup1}$, $S_{sup2}$ (FIG. 2);

muscles (FIGS. 6, 7 and 12): A, I, ZN in FIG. 10 and/or A, I, zn in the embodiment shown in FIGS. 15 and 16, where the parameters $S_{pd}$, $S_{pg}$, $S_{me}$, $S_{CO}$, $S_{inf1}$, $S_{inf2}$, $S_{sup1}$, $S_{sup2}$, A and I are mesh nodes each marked by a mesh number and a mesh node number, AT and AB and/or dAt and dAb are expressed as fractions of the modulus of the vector $$\overrightarrow{AI},$$

and $\alpha_M$, $\alpha$ and/or $\alpha_{eh}$, $\alpha_{ev}$ and $\beta_e$ are angles expressed in degrees.

The server SE2a of the client-server system of the first embodiment, acting as teacher, comprises a facial animation interface IAF and a scenario base BS. The interface IAF receives QR/CL question or response digital messages from the microphone MP or the keyboard KP of the client CLa and interprets them as requests RQ applied to the base BS, which selects responses RP in accordance with a predetermined scenario. A response RP is interpreted by the interface IAF in such a manner as to feed, on the one hand, a QR/SE question or response message to the loudspeaker HP of the client CLa and, on the other hand, animation commands CA to the animation module MAa to animate the head of the teacher displayed on the screen of the client CLa in harmony with the QR/SE message transmitted.

For example, a professor-pupil application of this embodiment consists in the pupil revising lessons by exchanging questions-responses with the teacher. In this type of application, the pupil-client CLa remains connected to the teacher-server SE2a throughout the lesson session and is controlled completely by the teacher-server.

The animation commands CA are not tied to the animation engine contained in the module MAa of the client, and control the animation of the head of the teacher as a function of the responses RP supplied by the base BS. In this first embodiment, the animation commands CA and the QR/CL and QR/SE messages are exchanged between the client CLa and the server SE2a via a telecommunication network RT; for example, the server SE2a is a software application on an Internet site or in a physical server of an Intranet network. By way of non-exhaustive example, the animation commands CA relate to all or some of the following facial animations:

turning the head TE X degrees about the axis OX, Y degrees about the axis OY and Z degrees about the axis OZ;

turning the right eye BOD or the left eye BOG X degrees about the axis OX and Y degrees about the axis OY;

turning the right eyelid PAD or the left eyelid PAG Q degrees about the respective right or left axis APA;

enunciating a text in a synthesized and amplified voice to produce the corresponding labial animation;

enunciating a sound to produce the corresponding labial animation;

choosing a neutral expression for the face of the head; and portraying an emotion, joy or sadness, for example with a predetermined percentage.

Figure 19:
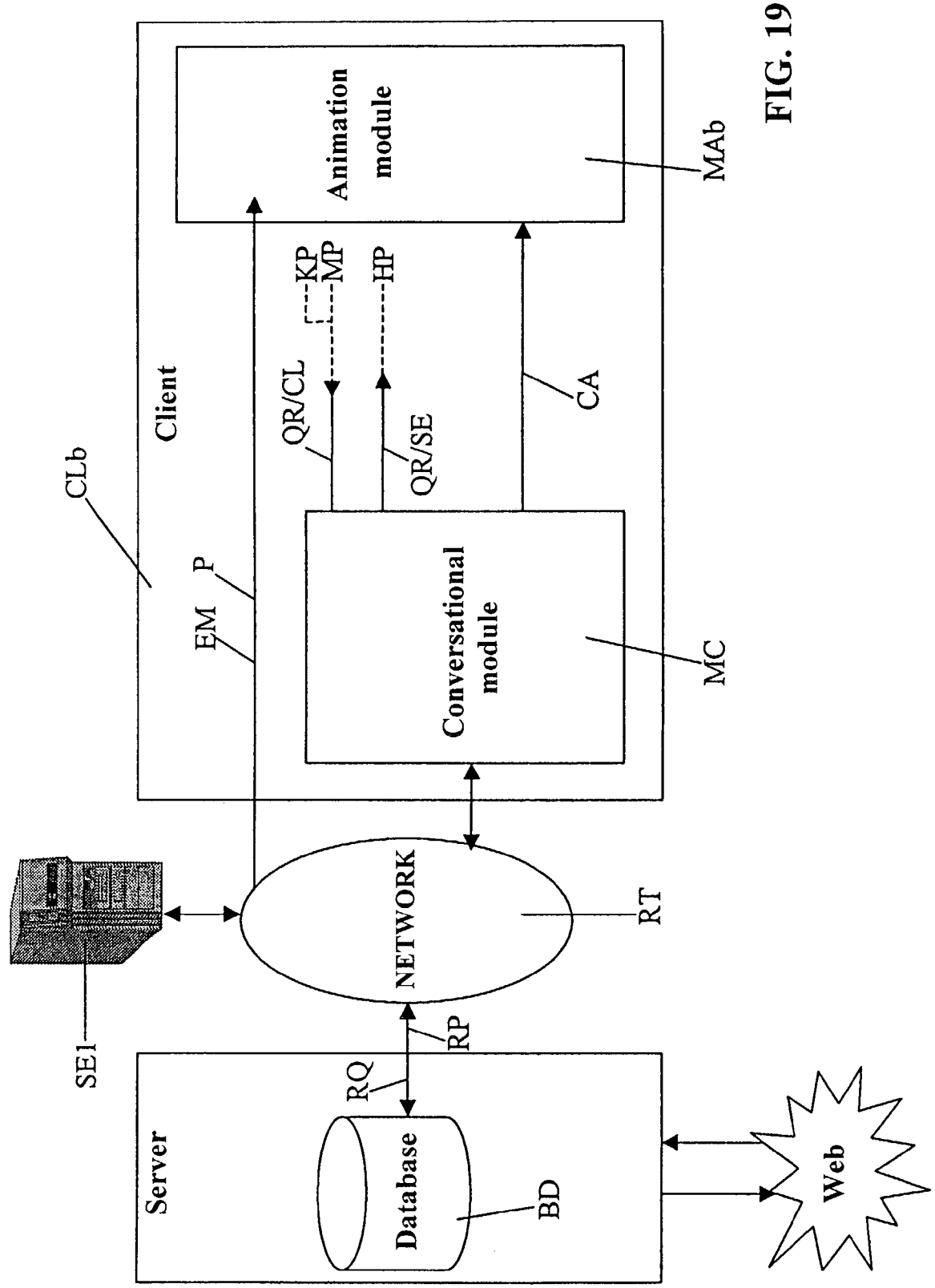

The second embodiment of the client-server system, shown in FIG. 19, is more localized in hardware terms in a client CLb which is a home computer installed in the home of a user. The client CLb also contains an animation module MAb which an animation engine according to the invention and a second software module called as conversational module MC are implemented. The module MC has substantially the same role as the facial animation interface IAF of the first embodiment, and makes the client CLb more autonomous than the client CLa. The animation engine has previously acquired sets of meshes EM and parameters P defining a head of a receptionist, either during instaflation of the client CLb or by subsequently consulting the first server SE1. The conversational module MC uses artificial intelligence and plays the role of the user's "confidante". Thus this "confidante" occupies itself with various tasks for managing the user's home, such as regulating the temperature of the boiler, managing an alarm system and/or participating in maintenance, as well as collecting information from various servers, such as the server SE3 shown in FIG. 19. The servers SE3 make available databases BD, including scenario databases, for consulting diverse information, such as cinema times, weather forecasts, lists of restaurants, etc.

The conversational module MC acquires responses RP to requests RQ addressed to one of the servers SE3 to animate the head of the receptionist displayed on the screen of the client CLb as a function of animation commands CA as defined above, either in real time or off-line. For example, if the user is seeking cinema times or a weather forecast, he formulates a QR/CL message to the conversational module MC via the microphone MP or the keyboard KP of the client CLb and the module MC immediately forwards a QR/SE response message to the loudspeaker HP of the client CLb with corresponding animation commands CA applied to the module Mab, if the conversational module has already stored the cinema times or the weather forecast. If not, the conversational module MAb interrogates the corresponding server SE3 via a telecommunication network RT, to read therein the times or forecasts, which will then be sent off-line to the user via the animation module MAb so that the user can consult the cinema times in the evening and the weather forecast on waking up.

In this second embodiment, the hardware client CLb has a client-server processing model between the modules MAb and MC, and a data client-server combination with the server SE3.

The two embodiments of client-server system described above advantageously are free of timing constraints because the animation commands CA for the animation module MAa, MAb are not predefined but executed in real time as a function of QR/SE messages from the "server" IAF, MC. The animation commands are synchronized at the level of the animation module MAa, MAb of the-client, and not at the server level, which prevents any time lapse between the spoken sound and the animation of the lips.

The invention claimed is:

1. A method of animating, by use of modelled facial muscles, a head imaged in three dimensions and acquired in a data processing arrangement in the form of sets of meshes including a set of lips, said method including the steps of:

distinguishing a lower lip and an upper lip in said set of lips as a function of mesh nodes at the level of a lip corner and mouth opening boundary, the distinguishing step including:

(a) identifying mesh nodes at the periphery of said set of lips to define an interior contour and an exterior contour of said lips, (b) detecting laterally outermost mesh nodes on said interior contour and exterior contour, (c) marking mesh nodes below one of lip corner segments defined by the nodes previously detected as belonging to said lower lip, (d) recursively marking all the unmarked mesh nodes, starting with nodes near a lower node of said lower lip, as belonging to said lower lip, and (e) marking all the other unmarked nodes in said set of lips not belonging to said lower lip as belonging to said upper lip, determining an upper zone and a lower zone of said head substantially shared by at least a lip corner and mouth opening boundary between the mesh nodes belonging to said lower lip and the mesh nodes belonging to said upper lip, and providing a first group of modelled muscles extending toward said upper lip and having zones of influence intersecting at least two by two situated in said upper zone for displacing mesh nodes in said upper lip and under a nose of said head, a second group of modelled muscles extending toward said lower lip and having zones of influence intersecting at least two by two situated in said lower zone for displacing mesh nodes in said lower lip and in a chin of said head, and a last group of modelled muscles having zones of influence for displacing each of the mesh nodes in said upper zone and lower zone in order to stretch and contract said lips.

2. A method according to claim 1, wherein said last group includes modelled muscles extending respectively up to the corners of said lips and having independent zones of influence for respectively and independently moving mesh nodes in opposite directions toward the exterior of said corners of said lips.

3. A method according to claim 1, wherein said last group includes modelled muscles attached to the middle of the mouth and having independent zones of influence for respectively and independently displacing mesh nodes toward said corners of said lips and toward the interior of said mouth.

4. A method according to claim 1, wherein said determining step includes the following steps:

determining the middle of a segment between external nodes as laterally outermost nodes detected on said exterior contour of said lips, determining jaw pivot axis nodes, marking all the nodes situated under a broken line joining said jaw pivot axis nodes through said segment between said external nodes as belonging to the lower zone, and marking all the other mesh nodes of said head as belonging to the upper zone.

5. A method according to claim 1, wherein a modelled muscle is defined by a conical zone of influence having a cone angle $\alpha$, and a mesh node inside said zone of influence is subjected to a displacement vector that is directed toward the apex of said zone of influence at an angle $\beta$ to the axis of said zone of influence and which is proportional to an angular attenuation coefficient $\delta_A$ defined as follows:

$$\delta_A = \frac{\cos\beta - \cos\alpha}{1 - \cos\alpha}$$

6. A method according to claim 1, wherein a modelled muscle is defined by a vector having an origin A, an oriented extremity I in a frustoconical zone of influence having an apex dA, and two elliptical aperture angles, a mesh node $S_j$ situated within said zone of influence and at a radial distance $S'_jS_j$ from the axis of said zone of influence in an elliptical section of radius r passing through said mesh node $S_j$ is subjected to a displacement vector which is directed toward the node dA of said zone of influence and which is proportional to an angular attenuation coefficient $\delta_{eA}$ and to a radial attenuation coefficient $\delta_{eR}$ defined as follows:

$\delta_{eA} = (r^2 - \|S'_jS_j\|)/r^2$ $\delta_{eR} = (\|AI\|/\|dAI\|)\cos[((\|dAS_j\| - \|dAt'\|)/(\|dAS'_j\| - \|dAt'\|))(\pi/2)]$ and $\delta_e = \delta_{eA} = \|AI\|/\|dAI\|$ and $\delta_{eR} = 1$
if $\|dAa\| \leq \|dAS_j\| \leq \|dAt\|$
where t' is the intersection of segment $dAS_j$ with an intermediate base between a smaller base and a larger base of said zone of influence.

7. A method according to claim 1, wherein, when a mesh node is situated in a plurality of intersecting zones of influence of muscles, and further including displacing said mesh node by a displacement vector determined by adding displacement vectors resulting from the action of said muscles in order to obtain a resultant vector and then truncating said resultant vector so that said resultant vector has a modulus equal to the highest modulus of said displacement vectors of said muscles.

8. A method according to claim 1, wherein there is included a group of modelled frontal muscles respectively extending downward substantially as far as external, middle and internal extremities of eyebrows of said head and to middles of eyelids of said head, and having zones of influence intersecting at least two by two to displace mesh nodes at least in said eyebrows and said eyelids.

9. A method according to claim 1, including a step of determining parameters for animating at least one of the following organs: an eye, an eyelid, a lower jaw, a neck in said head.

10. A method according to claim 1, including a step of determining a rotation center of an eye of said head as the middle of a segment whose extremities are two farthest apart mesh nodes in a set of meshes relating to a white of said eye.

11. A method according to claim 1, including a step of determining a rotation axis of an eyelid of said head passing through two farthest apart mesh nodes in a set of meshes relating to said eyelid.

12. A method according to claim 1, including the steps of:
determining mesh nodes as jaw pivot axis nodes, a chin node and a head—neck transition node to define an angular articulation sector AM of jaw,
determining a predetermined angular sector $\alpha_M$ less than and contained in said articulation sector AM and having a lower side common therewith, and
marking mesh nodes substantially contained within said articulation sector AM, in order for a rotation of the jaw to operate completely on mesh nodes situated within an angular sector AM—$\alpha_M$ and in an attenuated manner on mesh nodes within said angular sector $\alpha_M$ so that, if angular distance $\alpha_i$ between a mesh node and said common lower side decreases, said mesh node is displaced as a function of an attenuation coefficient defined as follows:

$$1 - \cos\left(\frac{\alpha_i}{\alpha_M}\frac{\pi}{2}\right).$$

13. A method according to claim 1, including the steps of:
determining upper and lower anterior nodes and upper and lower posterior nodes ● of a neck of said head;
marking mesh nodes substantially contained between lateral planes passing through said upper and lower nodes as belonging to said neck;
marking all the mesh nodes in said head that do not belong to said neck;
determining a center of rotation of said head consisting of the center of a volume encompassing mesh nodes belonging to said neck; and
determining minimum and maximum ordinates $Y_{min}$ and $Y_{max}$ of said upper and lower nodes of said neck, in order for a subsequent rotation of said neck to operate completely on mesh nodes situated above a lateral plane passing through said upper nodes and in an attenuated fashion on mesh nodes within said neck so that the closer the mesh node with the ordinate $Y_{si}$ to a lateral plane passing through said lower nodes, the greater the angular displacement of said mesh node with said ordinate $Y_{si}$ decreases as a function of a ratio defined as follows:

$$\frac{(Y_{Si} - Y_{min})}{(Y_{max} - Y_{min})}.$$

14. A client-server system, comprising a client data processing arrangement having a three-dimensional model of a head in the form of sets of meshes including a set of lips and parameters, and a processing server for converting responses read in a database addressed by requests corresponding to messages transmitted by the client into messages and animation commands transmitted to the client for thereby animating said head as a function of said animation commands in said client data processing arrangement,
said client data processing arrangement being arranged for:
(a) distinguishing a lower lip and an upper lip in said set of lips as a function of mesh nodes at the level of a lip corner and mouth opening boundary, the client data processing arrangement being arranged for distinguishing the lower and upper lip by steps including:
(i) identifying mesh nodes at the periphery of said set of lips to define an interior contour and an exterior contour of said lips,
(ii) detecting laterally outermost mesh nodes on said interior contour and exterior contour,
(iii) marking mesh nodes below one of lip corner segments defined by the nodes previously detected as belonging to said lower lip,
(iv) recursively marking all the unmarked mesh nodes, starting with nodes near a lower node of said lower lip, as belonging to said lower lip, and
(v) marking all the other unmarked nodes in said set of lips not belonging to said lower lip as belonging to said upper lip, (b) determining an upper zone and a lower zone of said head substantially shared by at least a lip corner and mouth opening boundary between the mesh nodes belonging to said lower lip and the mesh nodes belonging to said upper lip, and (c) providing a first group of modelled muscles extending toward said upper lip and having zones of influence intersecting at least two by two situated in said upper zone for displacing mesh nodes in said upper lip and under a nose of said head, a second group of modelled muscles extending toward said lower lip and having zones of influence intersecting at least two by two situated in said lower zone for displacing mesh nodes in said lower lip and in a chin of said head, and a last group of modelled muscles having zones of influence for displacing each of the mesh nodes in said upper zone and lower zone in order to stretch and contract said lips.

15. A client-server system according to claim 14, wherein said sets of meshes are arranged to be selected and acquired from a predetermined server.

16. A client-server system according to claim 14, wherein said parameters define at least animations of a jaw, a neck and muscles of said head.

17. A client-server system according to claim 14, wherein said animation commands relate to at least the following facial animations of said head: turning said head, turning an eye of said head, turning an eyelid of said head, enunciating a text, enunciating a sound, choosing a neutral expression of the face of said head, portraying an emotion.

18. A client-server system comprising a database server and a client data processing arrangement having a head modelled in three dimensions in the form of sets of meshes including a set of lips and parameters for thereby animating said head as a function of animation commands, said client data processing arrangement being arranged to provide head animation and simulated conversation, said simulated conversation being arranged for converting responses read in said database server addressed by requests of said simulated conversation corresponding to messages transmitted by said head animation into messages and animation commands transmitted to said head animation, said head animation being arranged for:

(a) distinguishing a lower lip and an upper lip in said set of lips as a function of mesh nodes at the level of a lip corner and mouth opening boundary, the head animation being arranged for distinguishing the lower lip from upper lip by steps including:

(i) identifying mesh nodes at the periphery of said set of lips to define an interior contour and an exterior contour of said lips, (ii) detecting laterally outermost mesh nodes on said interior contour and exterior contour, (iii) marking mesh nodes below one of lip corner segments defined by the nodes previously detected as belonging to said lower lip, (iv) recursively marking all the unmarked mesh nodes, starting with nodes near a lower node of said lower lip, as belonging to said lower lip, and (v) marking all the other unmarked nodes in said set of lips not belonging to said lower lip as belonging to said upper lip, (b) determining an upper zone and a lower zone of said head substantially shared by at least a lip corner and mouth opening boundary between the mesh nodes belonging to said lower lip and the mesh nodes belonging to said upper lip, and (c) providing a first group of modelled muscles extending toward said upper lip and having zones of influence intersecting at least two by two situated in said upper zone for displacing mesh nodes in said upper lip and under a nose of said head, a second group of modelled muscles extending toward said lower lip and having zones of influence intersecting at least two by two situated in said lower zone for displacing mesh nodes in said lower lip and in a chin of said head, and a last group of modelled muscles having zones of influence for displacing each of the mesh nodes in said upper zone and lower zone in order to stretch and contract said lips.

19. A client-server system according to claim 18, wherein said sets of meshes are selected and acquired from a predetermined server.

20. A client-server system according to claim 18, wherein said parameters are arranged for defining at least animations of a jaw, a neck and of muscles of said head.

21. A client-server system according to claim 18, wherein said animation commands relate to at least the following facial animations of said head: turning said head, turning an eye of said head, turning an eyelid of said head, enunciating a text, enunciating a sound, choosing a neutral expression of the face of said head, portraying an emotion.

22. A memory for a client-server system including a database server and a client data processing arrangement having a head modelled in three dimensions in the form of sets of meshes including a set of lips and parameters for thereby animating said head as a function of animation commands, the memory being arranged to cause the client data processing arrangement to provide head animation and simulated conversation, said simulated conversation being arranged for converting responses read in said database server addressed by requests of said simulated conversation corresponding to messages transmitted by said head animation into messages and animation commands transmitted to said head animation, said head animation being arranged for:

(a) distinguishing a lower lip and an upper lip in said set of lips as a function of mesh nodes at the level of a lip corner and mouth opening boundary, the head animation being arranged for distinguishing the lower lip from upper lip by steps including:

(i) identifying mesh nodes at the periphery of said set of lips to define an interior contour and an exterior contour of said lips, (ii) detecting laterally outermost mesh nodes on said interior contour and exterior contour, (iii) marking mesh nodes below one of lip corner segments defined by the nodes previously detected as belonging to said lower lip, (iv) recursively marking all the unmarked mesh nodes, starting with nodes near a lower node of said lower lip, as belonging to said lower lip, and (v) marking all the other unmarked nodes in said set of lips not belonging to said lower lip as belonging to said upper lip, (b) determining an upper zone and a lower zone of said head substantially shared by at least a lip corner and mount opening boundary between the mesh nodes belonging to said lower lip and the mesh nodes belonging to said upper lip, and (c) providing a first group of modelled muscles extending toward said upper lip and having zones of influence intersecting at least two by two situated in said upper zone for displacing mesh nodes in said upper lip and under a nose of said head, a second group of modelled muscles extending toward said lower lip and having zones of influence intersecting at least two by two situated in said lower zone for displacing mesh nodes in said lower lip and in a chin of said head, and a last group of modelled muscles having zones of influence for displacing each of the mesh nodes in said upper zone and lower zone in order to stretch and contract said lips.

23. The memory of claim 22, wherein said sets of meshes are selected and acquired from a predetermined server.

24. The memory of claim 22, wherein said parameters define at least animations of a jaw, a neck and of muscles of said head.

25. The memory of claim 22, wherein said animation commands relate to at least the following facial animations of said head: turning said head, turning an eye of said head, turning an eyelid of said head, enunciating a text, enunciating a sound, choosing a neutral expression of the face of said head, portraying an emotion.

* * * * *